(12) United States Patent
Voisine et al.

(10) Patent No.: US 7,619,406 B2
(45) Date of Patent: Nov. 17, 2009

(54) METHODS AND APPARATUS FOR MAGNETIC ARTICLE DETECTION

(75) Inventors: Cory Voisine, Weare, NH (US); Devon Fernandez, Manchester, NH (US); Karl Scheller, Bow, NH (US); Ravi Vig, Bow, NH (US); Kirsten Doogue, Manchester, NH (US)

(73) Assignee: Allegro Microsystems, Inc., Worcester, MA (US)

( * ) Notice: Subject to any disclaimer, the term of this patent is extended or adjusted under 35 U.S.C. 154(b) by 0 days.

(21) Appl. No.: 12/041,055

(22) Filed: Mar. 3, 2008

(65) Prior Publication Data

US 2008/0143327 A1 Jun. 19, 2008

Related U.S. Application Data

(62) Division of application No. 11/333,522, filed on Jan. 17, 2006, now Pat. No. 7,362,094.

(51) Int. Cl.
*G01B 7/30* (2006.01)
*G01R 33/00* (2006.01)

(52) U.S. Cl. .................................. 324/207.25; 324/225

(58) Field of Classification Search ............ 324/207.13, 324/207.26, 173, 207.21, 207.25, 174, 207.2, 324/207.12, 225, 166; 338/32 R, 32 H; 327/510, 327/511
See application file for complete search history.

(56) References Cited

U.S. PATENT DOCUMENTS 4,144,519 A 3/1979 Chamuel (Continued)

FOREIGN PATENT DOCUMENTS

EP 1211500 A1 5/2002

OTHER PUBLICATIONS

Allegro Microsystems, Inc. Concept Datasheet ATS673 and ATS674, "Self-Calibrating TPOS Gear Tooth Sensor Optimized for Automotive Cam Sensing Applications", 2005, 20 pages.

(Continued)

*Primary Examiner*—Reena Aurora
(74) *Attorney, Agent, or Firm*—Daly, Crowley, Mofford & Durkee, LLP

(57) ABSTRACT

Apparatus and methods for detecting passing magnetic articles using a first, True Power On State (TPOS) detector during a first time interval and transitioning to a second, running mode detector after the first time interval, when the output of the second detector is accurate. A phase comparator is responsive to the output signal of the first and second detectors and provides a control signal indicative of a change in the phase relationship between the two output signals. An output switch controlled by the phase comparator provides, as the detector output signal, the first detector output signal during the first time interval and the second detector output signal thereafter. A threshold signal associated with the TPOS detector is at a fixed level during a first portion of the first time interval and is adjusted during a second portion of the first time interval in response to an automatic gain control circuit in order to reduce the phase error associated with transitioning from the TPOS detector to the running mode detector. Also described are apparatus and methods for updating a running mode threshold signal that is a percentage of the peak-to-peak magnetic field sensor signal, so that unnecessary update events are reduced.

19 Claims, 12 Drawing Sheets

U.S. PATENT DOCUMENTS

| | | | |
|---|---|---|---|
| 5,650,719 | A | 7/1997 | Moody et al. |
| 5,694,038 | A * | 12/1997 | Moody et al. ............ 324/207.2 |
| 5,917,320 | A | 6/1999 | Scheller et al. |
| 6,091,239 | A | 7/2000 | Vig et al. |
| 6,100,680 | A | 8/2000 | Vig et al. |
| 6,232,768 | B1 | 5/2001 | Moody et al. |
| 6,242,908 | B1 | 6/2001 | Scheller et al. |
| 6,297,627 | B1 | 10/2001 | Towne et al. |
| 6,417,662 | B1 | 7/2002 | Wallrafen |
| 6,525,531 | B2 | 2/2003 | Forrest et al. |
| 6,919,720 | B2 | 7/2005 | Vig et al. |
| 7,138,793 | B1 | 11/2006 | Bailey |
| 7,362,094 | B2 | 4/2008 | Voisine et al. |
| 7,365,530 | B2 | 4/2008 | Bailey et al. |
| 2001/0009367 | A1 | 7/2001 | Sietzer et al. |
| 2003/0145663 | A1 | 8/2003 | Heisenberg et al. |

OTHER PUBLICATIONS

International Search Report (Form PCT/ISA/210) and Written Opinion of the International Searching Authority (Form PCT/ISA/237), for PCT/US2006/040465, Feb. 16, 2007, 10 pages.

International Search Report (Form PCT/ISA/210) and Written Opinion of the International Searching Authority (Form PCT/ISA/237), for PCT/US2006/040465, Apr. 23, 2007, 10 pages.

International Preliminary Report on Patentability (Form PCT/IB/373) for PCT/US2006/040465, dated Jul. 22, 2008, 8 pages.

Restriction Office Action dated Dec. 1, 2006 from U.S. Patent 7,362,094, 6 pages.

Response to Restriction Office Action dated Dec. 1, 2006 as filed on Dec. 11, 2006, 1 page.

Office Action dated Jan. 3, 2007 from U.S. Patent 7,362,094, 8 pages.

Response to Office Action dated Jan. 3, 2007 as filed on Jan. 19, 2007, 24 pages.

Restriction Office Action dated Apr. 19, 2007 from U.S. Patent 7,362,094, 8 pages.

Response to Restriction Office Action dated Apr. 19, 2007 as filed on Apr. 30, 2007, 1 page.

Office Action dated Jul. 11, 2007 from U.S. Patent 7,362,094, 6 pages.

Response to Office Action dated Jul. 11, 2007 as filed on Sep. 24, 2007, 9 pages.

Notice of Allowance dated Mar. 27, 2008 from U.S. Patent 7,362,094, 4 pages.

Office Action dated Jul. 1, 2008 from U.S. Appl. No. 12/041,052, filed Mar. 3, 2008, 8 pages.

Response to Office Action dated Jul. 1, 2008 as filed on Aug. 4, 2008, 8 pages.

Office Action dated Sep. 30, 2008 from U.S. Appl. No. 12/041,052, filed Mar. 3, 2008, 6 pages.

Response to Office Action dated Sep. 30, 2008 as filed on Dec. 15, 2008 with Terminal Disclaimer and Information Disclosure Statement, 12 pages, U.S. Appl. No. 12/041,052.

File downloaded from Pair for U.S. Appl. No. 12/041,052, filed Mar. 3, 2008, file from Jan. 30, 2009 through May 28, 2009, 17 pages.

* cited by examiner

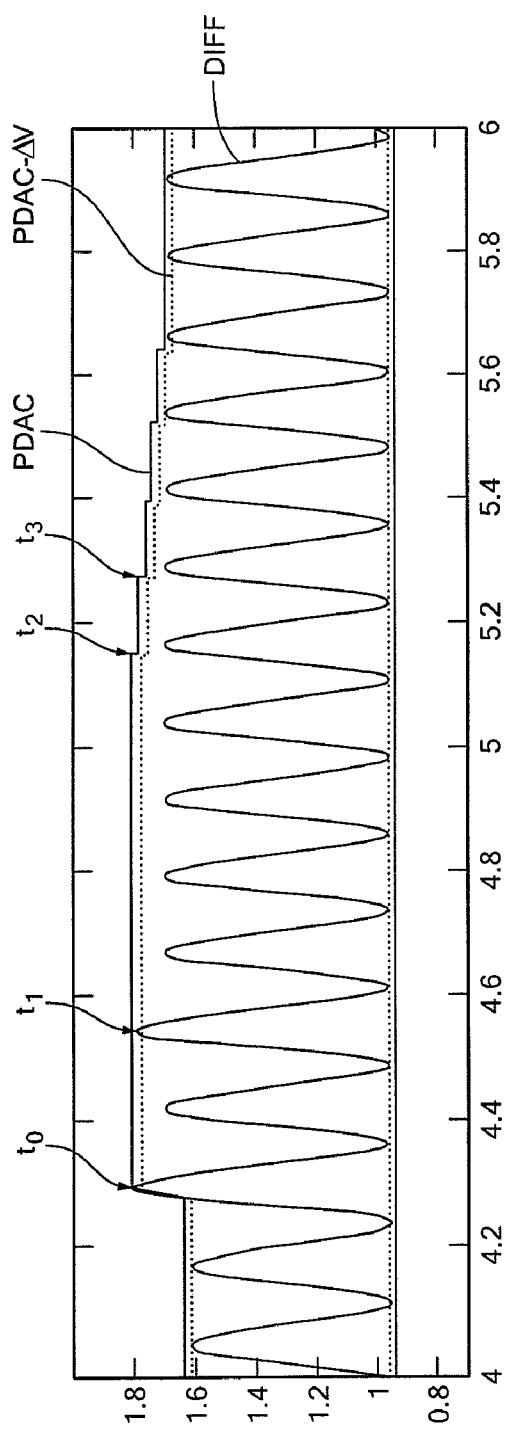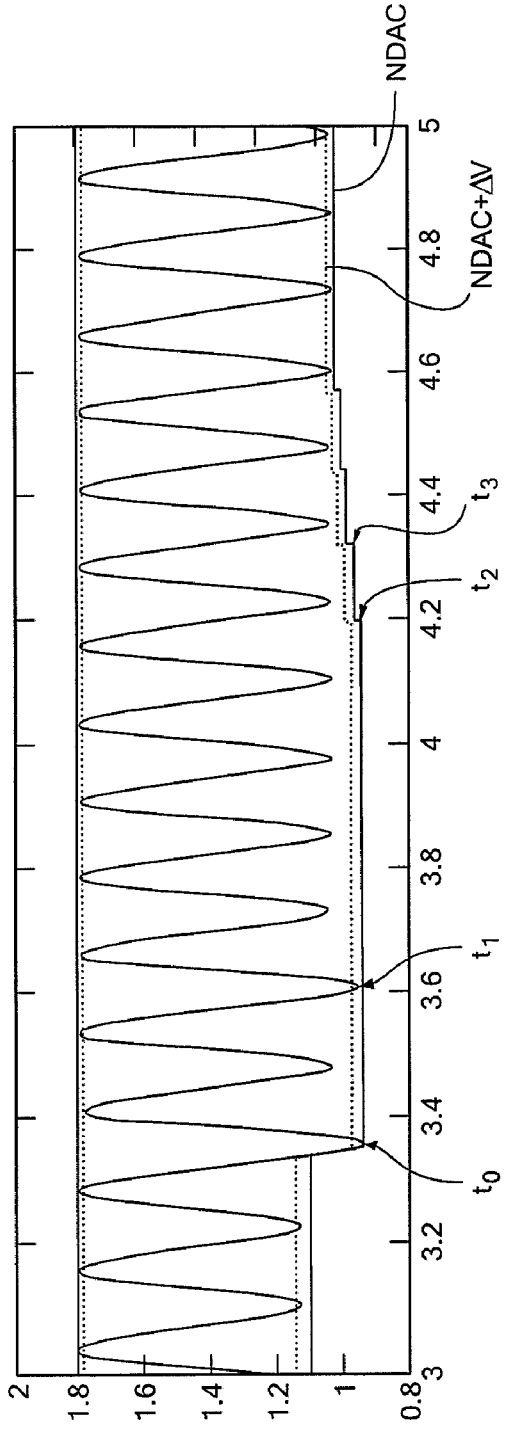

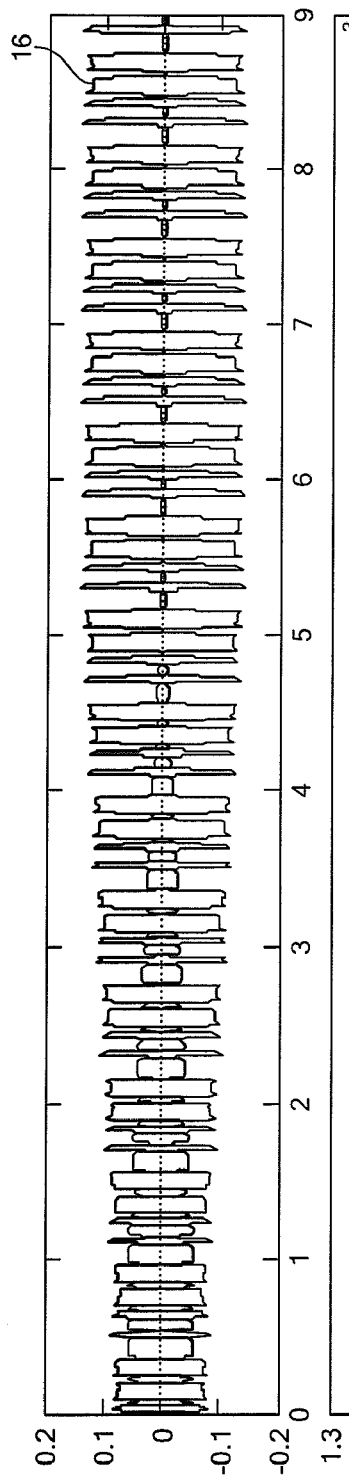
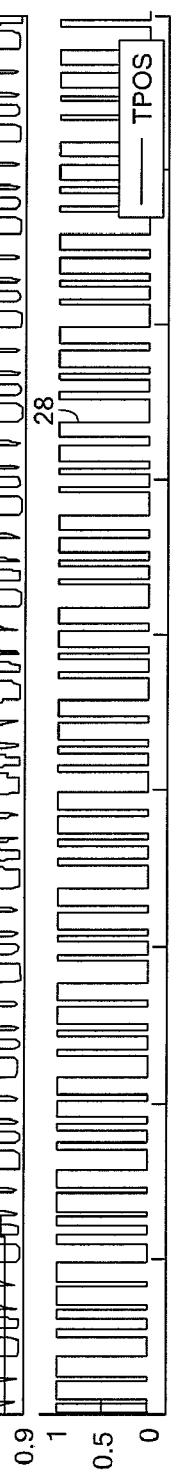
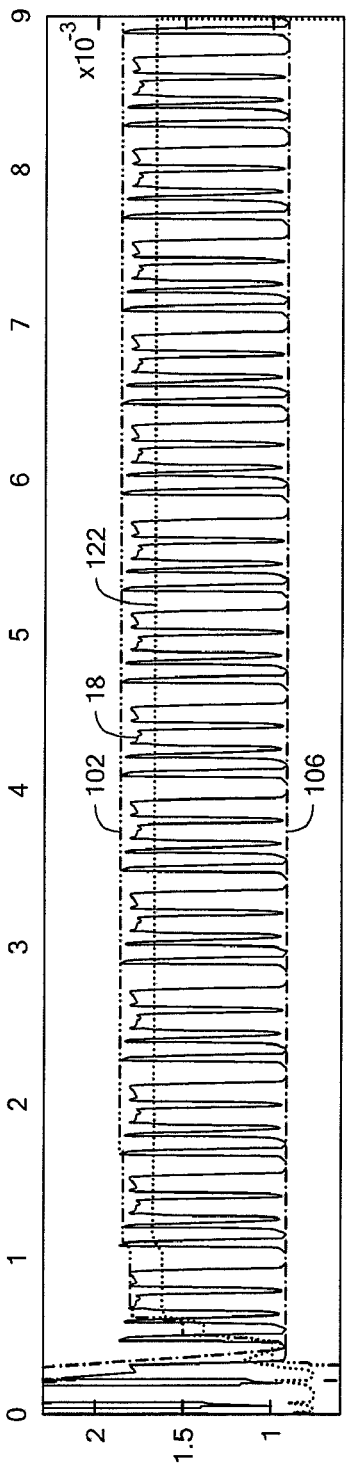
FIG. 3
FIG. 3A
FIG. 3B
FIG. 3C

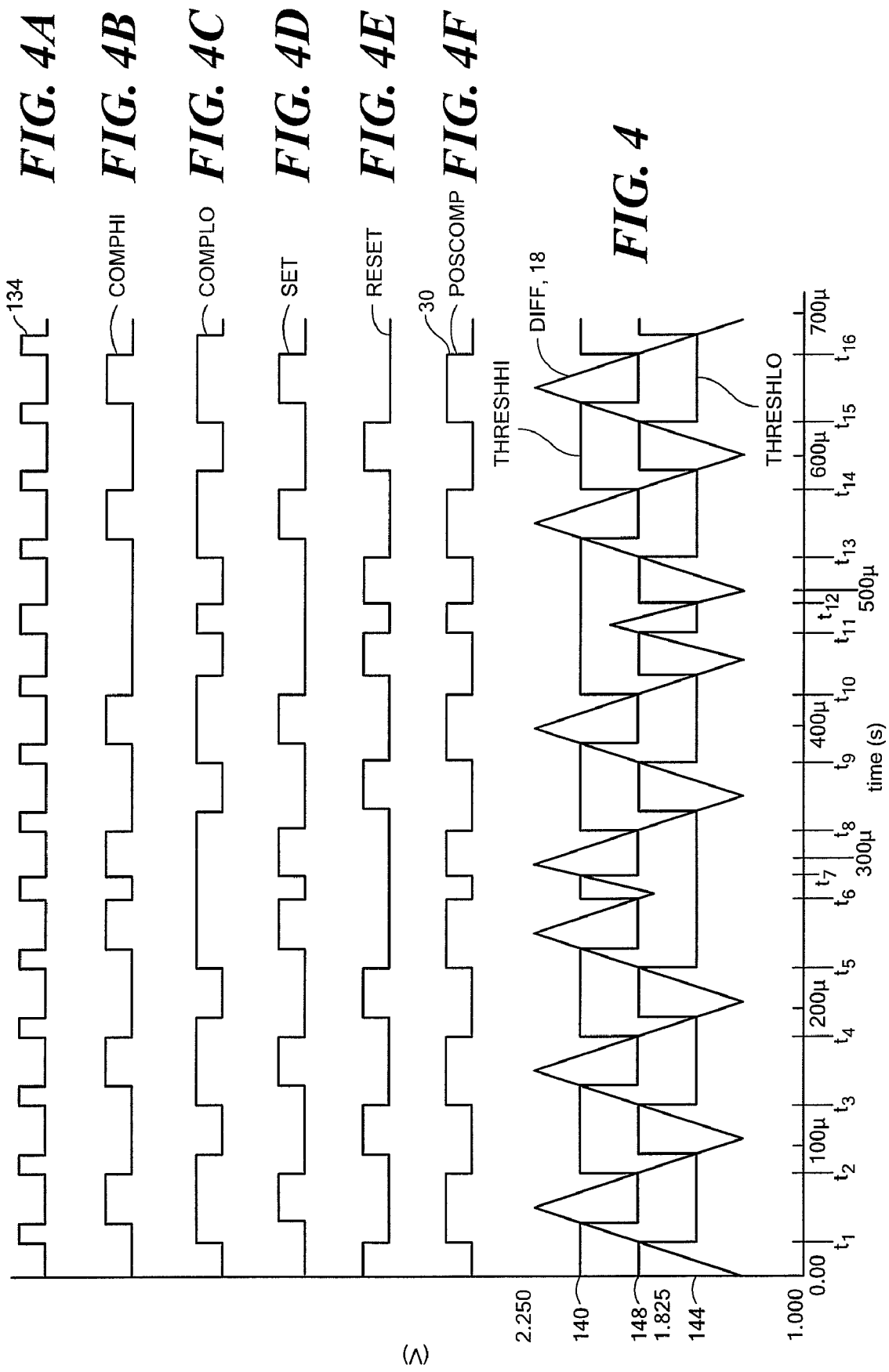

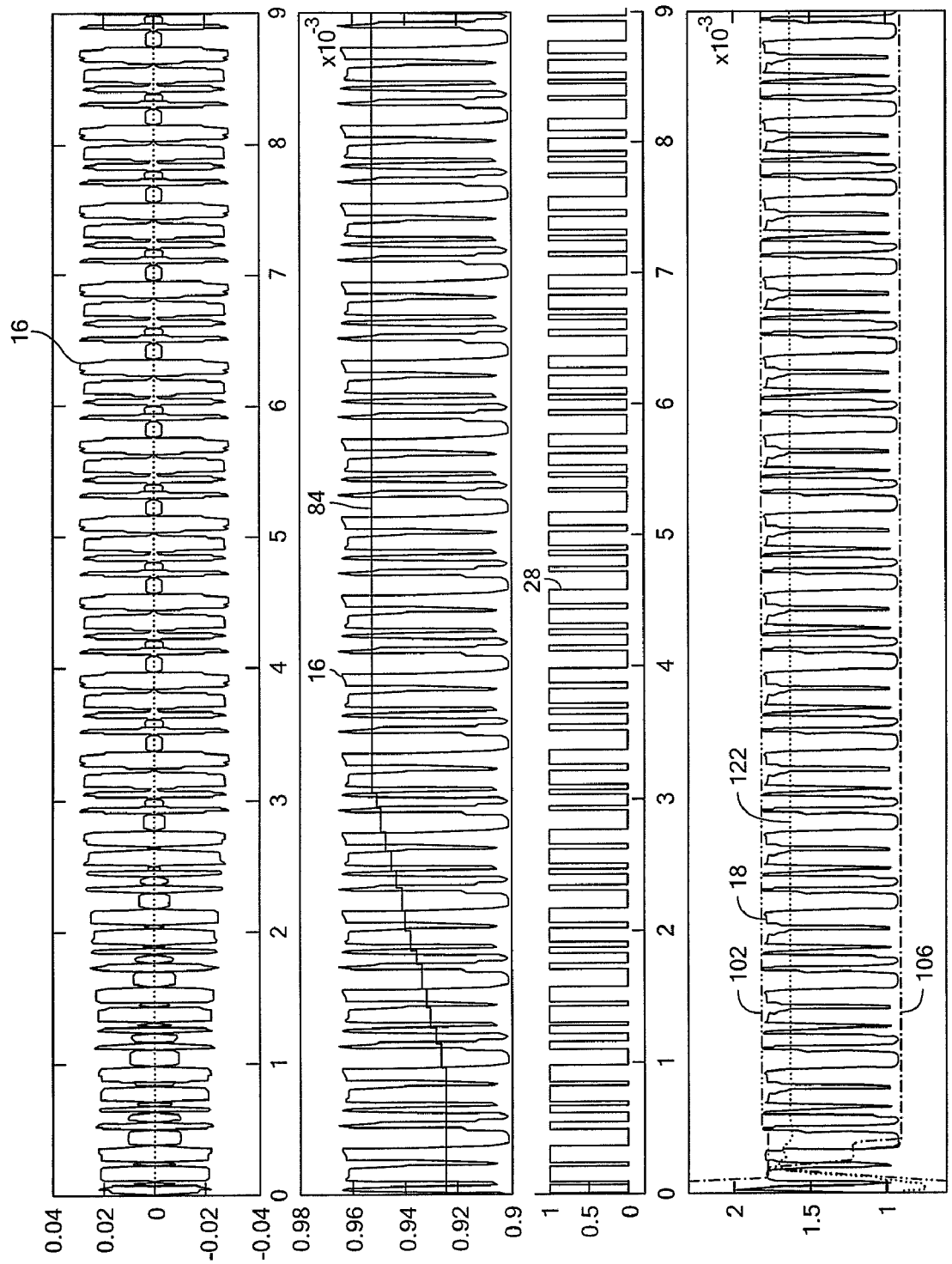

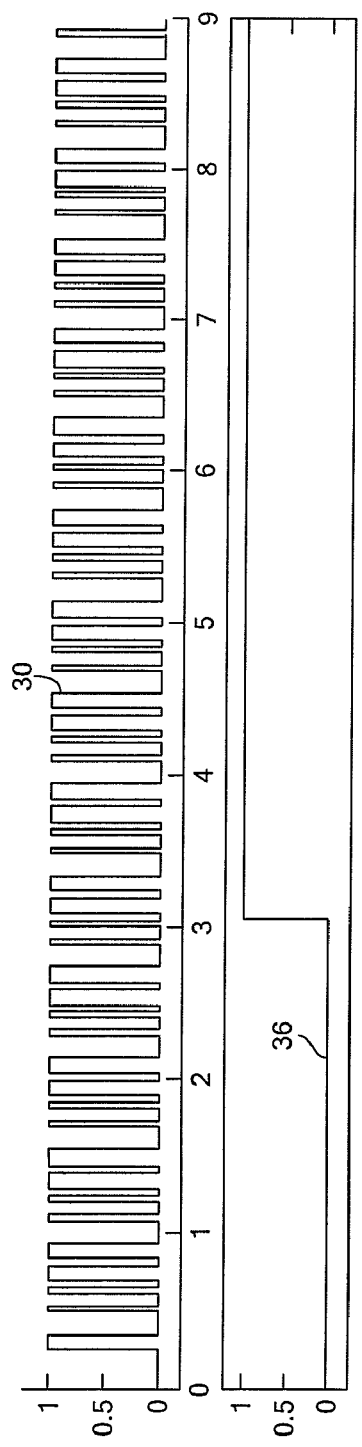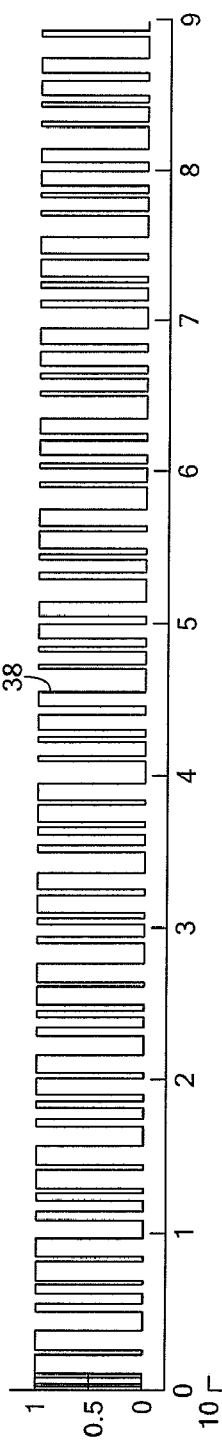
FIG. 6D
FIG. 6E
FIG. 6F
FIG. 6G

METHODS AND APPARATUS FOR MAGNETIC ARTICLE DETECTION

CROSS REFERENCE TO RELATED APPLICATIONS

This application is a divisional of U.S. patent application Ser. No. 11/333,522 filed Jan. 17, 2006 now U.S. Pat. No. 7,362,094.

STATEMENT REGARDING FEDERALLY SPONSORED RESEARCH

Not Applicable.

FIELD OF THE INVENTION

This invention relates generally to magnetic article detectors and, more particularly, to a magnetic article detector having a reduced phase error associated with transitioning from a power up detection mode to a running detection mode.

BACKGROUND OF THE INVENTION

Various types of magnetic field sensing elements are known, including Hall effect and magnetoresistive elements. Generally, sensors including magnetic field sensing elements provide an electrical signal representative of the sensed magnetic field and, in the presence of a moving ferromagnetic target object, the magnetic field signal is indicative of the shape or profile of the target object.

Magnetic field sensors are often used to detect gear features, such as gear teeth and/or gear slots. A magnetic field sensor in this application is commonly referred to as a "gear tooth" sensor. Gear tooth sensors are used in automotive applications to provide information to an engine control unit for ignition timing control, fuel management, and other operations.

Some circuits for detecting moving or passing magnetic articles do not provide an accurate output signal immediately upon power up and/or down to zero speed of the magnetic article. For example, in one type of magnetic article detector described in U.S. Pat. No. 6,525,531, a positive digital-to-analog converter (PDAC) and a negative digital-to-analog converter (NDAC) track the positive and negative peaks of the magnetic field signal respectively, for use in generating a threshold signal for comparison to the magnetic field signal. This type of detector, in which the threshold signal is a function of the positive an negative peaks of the magnetic field signal, is referred to herein as a running mode detector. However, the outputs of the PDAC and the NDAC may not be accurate indications of the positive and negative peaks of the magnetic field signal until several cycles of the signal (i.e., signal peaks) occur.

One technique for detecting passing magnetic articles at power up and down to zero speed of the target object is to use an additional detector, sometimes referred to as a True Power On State (TPOS) detector, that provides an accurate output before the running mode detector. The TPOS detector includes a comparator for comparing the magnetic field signal to a fixed, often trimmed threshold signal.

Various techniques are possible for determining when to transition from using the TPOS detector to provide the magnetic article detector output signal to using the running mode detector to provide the detector output signal. In one example, the transition is made after a predetermined voltage separation occurs between the PDAC and NDAC voltages.

SUMMARY OF THE INVENTION

According to the invention, a magnetic article detector includes a magnetic field sensor providing a magnetic field sensor signal that is proportional to an ambient magnetic field, a first circuit, herein referred to as the True Power On State (TPOS) detector, responsive to the magnetic field sensor signal to provide a first output signal indicative of passing magnetic articles, which first output signal provides the magnetic article detector output signal during a first time interval, and a second circuit, herein referred to as the running mode detector, responsive to the magnetic field sensor signal to provide a second output signal indicative of the passing magnetic articles, which second output signal provides the magnetic article detector output signal during a second time interval following the first time interval. A phase comparator is responsive to the first and second output signals to provide a control signal indicative of a change in the phase relationship between the first and second output signals and an output switch provides the magnetic article detector output signal in the form of the first output signal or second output signal in response to the control signal.

Also described is a method for detecting passing magnetic articles including providing a magnetic field signal proportional to an ambient magnetic field, for a first time interval detecting the passing magnetic articles with a first detector responsive to the magnetic field signal to provide a first detector output signal, for a second time interval following the first time interval detecting the passing magnetic articles with a second detector responsive to the magnetic field signal to provide a second detector output signal, and transitioning from the first time interval to the second time interval in response to a change in the phase relationship between the first detector output signal and the second detector output signal.

With these arrangements, the transition from when the TPOS detector output signal provides the magnetic article detector output signal to when the running mode detector output signal provides the magnetic article detector output signal occurs when a detection by the TPOS detector is close in phase to a detection by the running mode detector, as is desirable to reduce the phase jump, or phase error, between consecutive detections. In the context of a gear tooth sensor, phase jump, or phase error, refers to the phase difference between detections, including detections of the same feature, such as a particular gear tooth edge, on subsequent revolutions and detections of different features, such as adjacent gear teeth, on the same revolution. As an example in the case of phase error related to detections of the same gear tooth on different revolutions, if the rising edge of a gear tooth occurs at a position of 12 degrees and, on the next revolution, the rising edge of the same gear tooth occurs at 12.2 degrees, then the phase error or phase jump is 0.2 degrees. Many engine control units require that phase error be no greater than a few degrees.

According to a further aspect of the invention, the TPOS detector includes a comparator having a first input responsive to the magnetic field sensor signal and a second input responsive to an adjustable TPOS threshold signal. In one embodiment, the TPOS threshold signal is at a predetermined, fixed level during a first portion of the first time interval and is adjusted during a second portion of the first time interval in order to minimize the phase error associated with the transition from TPOS mode to running mode operation. Preferably, the TPOS threshold signal is adjusted by increments determined by an automatic gain control (AGC) circuit.

With this arrangement, once it is determined that the running mode detector output signal is accurate, the TPOS threshold signal is incrementally adjusted so as to advantageously reduce the phase error associated with consecutive detections by the TPOS detector and the running mode detector. By tailoring the step size of the TPOS threshold increments according to the AGC circuit, the TPOS threshold signal is adjusted in as short an amount of time as possible while still limiting phase error to below an acceptable limit.

Also described is apparatus for detecting passing magnetic articles to provide a magnetic article detector output signal including a magnetic field sensor providing a signal proportional to an ambient magnetic field and a first circuit that is responsive to the magnetic field sensor signal to provide a first output signal indicative of the passing magnetic articles, which first output signal provides the magnetic article detector output signal during a first time interval. A second circuit is responsive to the magnetic field sensor signal to provide a second output signal indicative of the passing magnetic articles, which second output signal provides the magnetic article detector output signal during a second time interval following the first time interval. The first circuit includes a comparator having a first input responsive to the magnetic field sensor signal, a second input responsive to an adjustable threshold signal, and an output at which the first output signal is provided.

According to another aspect of the invention, apparatus for detecting passing magnetic articles and providing a magnetic article detector output signal includes a magnetic field sensor providing a signal proportional to an ambient magnetic field, an automatic gain control circuit responsive to the magnetic field sensor signal for adjusting the gain of the magnetic field sensor signal, and a detector comprising a comparator. The comparator has a first input responsive to the magnetic field sensor signal or the gain-controlled version of the magnetic field sensor signal, a second input responsive to a threshold signal that is adjustable in response to the automatic gain control circuit, and an output at which the magnetic article detector output signal is provided.

According to a further aspect of the invention, apparatus for detecting passing magnetic articles includes a magnetic field sensor providing a signal proportional to an ambient magnetic field, a positive digital to analog converter (PDAC) operative to provide a PDAC signal that tracks positive peaks of the magnetic field sensor signal, and a negative digital to analog converter (NDAC) operative to provide an NDAC signal that tracks negative peaks of the magnetic field sensor signal. Also provided is a comparator having a first input responsive to the magnetic field sensor signal, a second input responsive to a threshold signal that is a percentage of the difference between the PDAC signal and the NDAC signal, and an output at which the detector output signal is provided. The PDAC signal increases in response to increasing positive peaks of the magnetic field sensor signal and the PDAC signal decreases in response to a predetermined number of positive peaks of the magnetic field sensor signal occurring that are less than a positive update threshold signal. The NDAC signal decreases in response to decreasing negative peaks of the magnetic field sensor signal and the NDAC signal increases in response to a predetermined number of negative peaks of the magnetic field sensor signal occurring that are greater than a negative update threshold signal.

With this arrangement, the PDAC and NDAC signals are updated to remain a desired percentage of the peak-to-peak magnetic field sensor signal, but without unnecessary signal updates.

BRIEF DESCRIPTION OF THE DRAWINGS

The foregoing features of the invention, as well as the invention itself may be more fully understood from the following detailed description of the drawings, in which:

FIG. 2D shows illustrative waveforms associated with updating of the PDAC signal by the running mode detector of FIGS. 2A-2C;

FIG. 2E shows illustrative waveforms associated with updating of the NDAC signal by the running mode detector of FIGS. 2A-2C;

FIG. 3 shows an illustrative magnetic field sensor signal detected by the detector of FIG. 2;

FIG. 3A shows the differential magnetic field sensor signal of FIG. 3 in single-ended form and the TPOS threshold signal;

FIG. 3B shows the TPOS detector output signal of FIG. 2 in response to the waveforms of FIG. 3A;

FIG. 3C shows a gain-controlled version of the magnetic field sensor signal of FIG. 3, the running mode threshold signal, and the PDAC and NDAC signals;

FIG. 4 shows an illustrative magnetic field sensor signal and running mode threshold signals associated with the running mode detector of FIG. 2A;

FIG. 4A shows a latch signal associated with the running mode detector of FIG. 2A in response to the signals of FIG. 4;

FIG. 4B shows a COMPHI signal associated with the running mode detector of FIG. 2A in response to the signals of FIG. 4;

FIG. 4C shows a COMPLO signal associated with the running mode detector of FIG. 2A in response to the signals of FIG. 4;

FIG. 4D shows the set input signal to the latch of FIG. 2A;

FIG. 4E shows the reset input signal to the latch of FIG. 2A;

FIG. 4F shows the running mode detector output signal in response to waveforms of FIGS. 4-4E;

FIG. 6 shows an illustrative magnetic field sensor signal detected by the magnetic article detector of FIG. 2 and associated with a larger airgap than the magnetic field sensor signal of FIG. 3;

FIG. 6A shows the differential magnetic field sensor signal of FIG. 6 in single-ended form and the TPOS threshold signal;

FIG. 6B shows the TPOS detector output signal in response to the waveforms of FIG. 6A;

FIG. 6C shows a gain-controlled version of the magnetic field sensor signal of FIG. 6, the running mode threshold signal, and the PDAC and NDAC signals;

FIG. 6D shows the running mode detector output signal in response to the waveforms of FIG. 6C;

FIG. 6E shows the phase detector output signal provided in response to the TPOS detector output signal of FIG. 6B and the running mode detector output signal of FIG. 6D;

FIG. 6F shows the detector output signal provided in response to the waveforms of FIGS. 6-6E; and FIG. 6G shows the phase error associated with edge detections by the magnetic article detector of FIGS. 2-2C and the waveforms of FIGS. 6-6F.

DETAILED DESCRIPTION OF THE INVENTION

Figure 1:
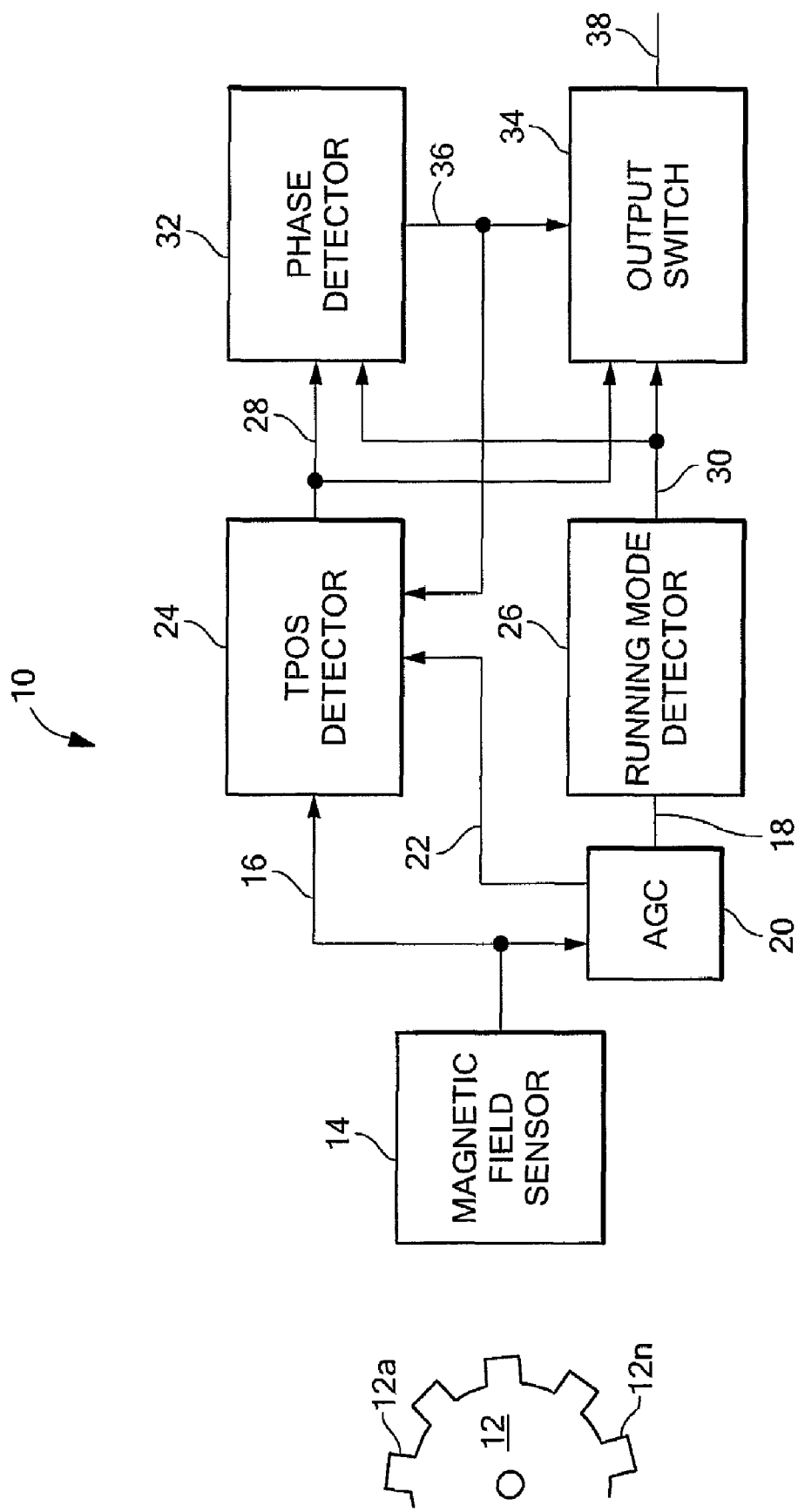
FIG. 1 is a simplified block diagram of a circuit for detecting passing magnetic articles according to the invention.

Referring to FIG. 1, a magnetic article detector 10 includes a magnetic field sensor 14 providing a magnetic field sensor signal 16 that is proportional to an ambient magnetic field. The detector 10 is positioned in proximity to a magnetic article, for example a gear 12, so that the magnetic field sensor signal 16 is indicative of the profile of the magnetic article 12. The detector 10 provides a detector output signal 38 indicative of the magnetic article 12 as it passes through the ambient magnetic field and here, a pulse train having transitions indicating edges of the gear teeth 12a-12n.

Preferably, each detection of a particular feature of the passing magnetic article 12 occurs at the same point on the magnetic field sensor signal 16. A variation in the phase of detections of the same feature on different revolutions of the magnetic article or of different features on the same revolution is referred to as an error or jump in the phase of the detector output signal 38 and can disadvantageously affect control units, such as engine control units in automotive applications, relying on the detector output signal. For example, in the context of phase error of a gear tooth sensor related to detections of the same feature on different revolutions, if the rising edge of the first tooth occurs at a gear position of 12 degrees and, on the next revolution, the rising edge of the same gear tooth occurs at 12.2 degrees, then the phase error or phase jump is 0.2 degrees.

The detector 10 is designed to reduce phase error in the detector output signal 38 occurring at the transition from a power up detection mode to a running detection mode and includes a first circuit 24, herein referred to as the True Power On State (TPOS) detector, that is responsive to the magnetic field sensor signal 16 to provide a first output signal 28 indicative of the passing magnetic article 12 and a second circuit 26, herein referred to as the running mode detector, that is responsive to the magnetic field sensor signal 16 to provide a second output signal 30 indicative of the passing magnetic article 12. The first output signal 28 provides the detector output signal 38 during a first time interval and the second output signal 30 provides the detector output signal 38 during a second time interval following the first time interval, as will be described.

A phase comparator, or detector 32 is responsive to the first and second output signals 28, 30 to provide a phase detector output signal, or control signal 36 indicative of a change in the phase relationship between the first and second output signals and an output switch 34 provides the detector output signal 38 in the form of the first output signal or the second output signal in response to the control signal 36. More particularly, the phase detector output signal 36 is at a first logic level when a rising edge of the TPOS detector output signal 28 leads a rising edge of the running mode detector output signal 30 and is at a second logic level when a rising edge of the TPOS detector output signal 28 lags a rising edge of the running mode detector output signal 30. The control signal 36 is also coupled to the TPOS detector 24 as shown for use in adjusting a TPOS threshold signal, as will be described.

An Automatic Gain Control (AGC) circuit 20 adjusts the gain of the magnetic field sensor signal 16 to provide a gain-adjusted version of the signal, referred to herein as the DIFF signal 18. Thus, in the illustrative embodiment, the running mode detector 26 is more directly responsive to the DIFF signal 18. The TPOS detector 24 is responsive to the AGC circuit 20 via a signal 22 for use in adjusting the TPOS threshold signal, as described below.

Figure 2:
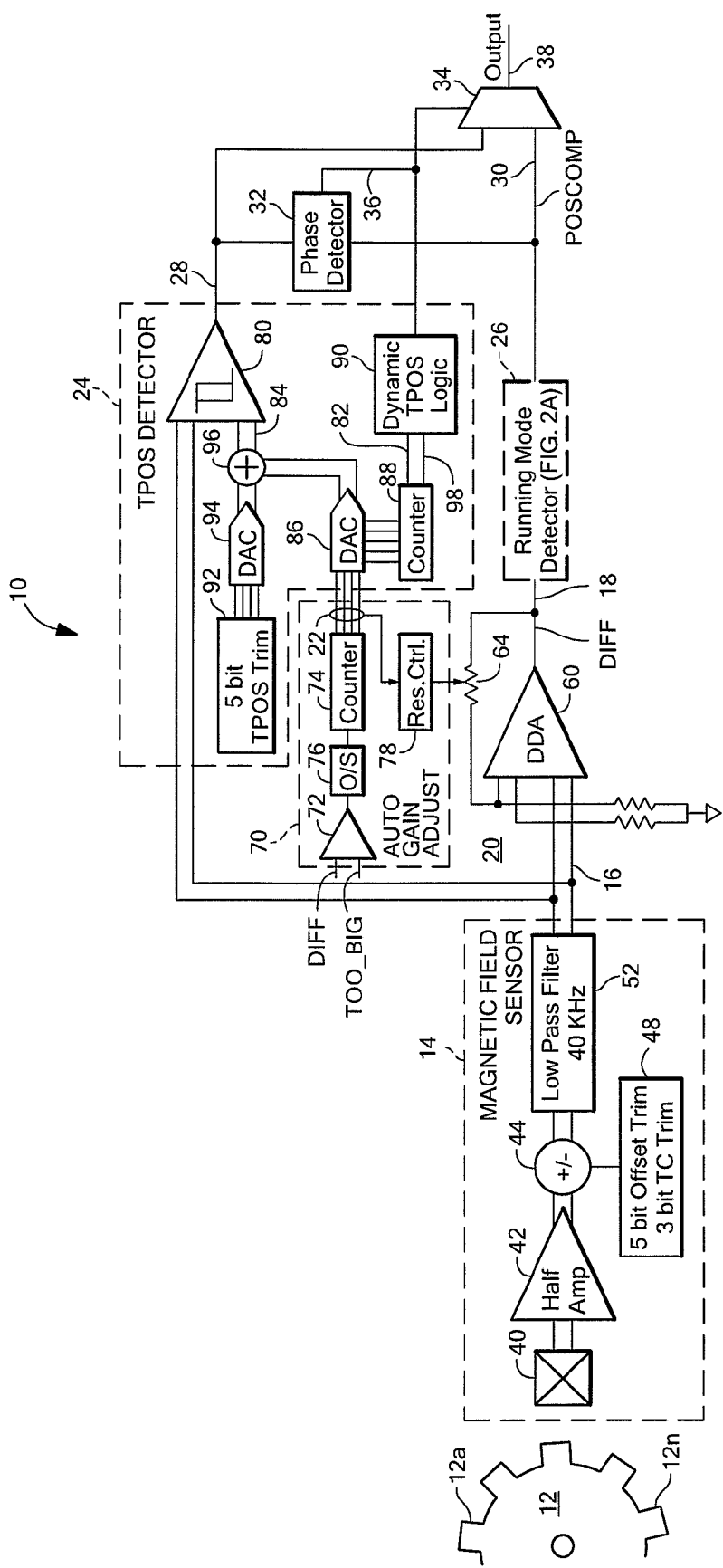
FIG. 2 shows the magnetic article detector of FIG. 1.

Referring also to FIG. 2, the magnetic field sensor 14 includes a magnetic field sensing element 40. The sensing element 40 may take various forms known in the art, including but not limited to a Hall effect element, a vertical Hall effect element, a Giant Magnetoresistive (GMR) element, an Anisotropic Magnetoresistive (AMR) element, and a Tunnel Magnetoresistive (TMR) element. Also, the magnetic field sensing element 40 may comprise a single magnetically responsive element or, alternatively, may comprise a plurality of elements arranged in various configurations. In the illustrative embodiment, the magnetic field sensing element 40 is a single Hall effect element.

Various circuits and techniques may be used to process the signal provided by the magnetic field sensing element 40. In the illustrative embodiment, the signal from the Hall effect element 40 is amplified by a Hall amplifier 42 and provided to a summing node 44 for DC offset cancellation. Various conventional techniques for DC offset cancellation are possible. In the illustrative embodiment, a 5 bit offset trim and a 3 bit temperature compensation trim 48 are provided, as may be implemented with fuses and trimmed during manufacture in order to center the signal from the Hall amplifier 40 within the voltage rails of the detector 10. A low pass filter 52 is coupled to the summing node 44 to provide the magnetic field sensor signal 16, as shown.

The AGC circuit 20 adjusts the gain of the magnetic field sensor signal 16 to provide the DIFF signal 18. In larger airgap installations, the magnetic field sensor signal 16 has a lower magnitude than in smaller airgap installations. It is generally advantageous to "normalize" the size of the magnetic field sensor signal 16 for further processing and detection. To this end, the AGC circuit 20 includes a dual differential amplifier (DDA) 60 that is responsive to the differential magnetic field sensor signal 16 and to an adjustable resistive feedback element 64, as shown. The feedback element 64 is adjustable in response to an auto gain adjust circuit 70.

Various schemes are possible to provide the auto gain adjust circuit 70 and more generally, to provide automatic gain control. In the illustrated embodiment, the circuit 70 includes a comparator 72 for comparing the DIFF signal 18 to an AGC threshold signal, TOO_BIG, and for providing an output signal to a one shot 76. The one shot 76 controls a counter 74 that is incremented every time the DIFF signal 18 exceeds the level of the AGC threshold signal. The counter output 22 is used to control the resistance of element 64 via a resistor control circuit 78.

In operation, the resistance of element 64 is initially set to provide a maximum gain to the magnetic field signal 16. If the resulting DIFF signal 18 is greater than the TOO_BIG signal, indicating clipping, then the output of the comparator 72 transitions and the one shot 76 provides a pulse to increment the counter 74. The incremented counter output 22 is provided to the resistor control circuit 78 for adjustment of the resistor 64 in a manner that causes the magnitude of the magnetic field signal 16 to be reduced. This comparison of the DIFF signal to the TOO_BIG signal occurs until a predetermined number of gear teeth have passed following power up, a reset of the detector 10, or an initial gear rotation (i.e., zero speed). In the illustrative embodiment, the AGC circuit 20 is active until three gear teeth, or six gear tooth edges pass the detector 10, after which the value of resistor 64 remains constant.

Once AGC operation ends, the output signal 22 of the AGC counter 74 remains at a fixed value representative of how many gain reductions, or decrements occurred during the AGC process (i.e., how many one shot pulses occurred). For example, in the case of a large airgap, no gain decrements may occur, thereby causing the counter output 22 to remain at a value of 0000 in the illustrative 4 bit counter embodiment. Whereas, in the case of a small airgap, several gain decrements may occur, thereby causing the counter output 22 to remain at the value corresponding to the number of gain decrements occurring during AGC. The AGC counter output signal 22 is coupled to the TPOS detector 24 for use in adjusting the TPOS threshold signal, as will be described.

As is known, the use of differential elements and differential signals can be advantageous for common mode noise reduction reasons. In the illustrative embodiment, the elements and signals before the AGC circuit 20 are differential and, after the gain stage 20, the elements and signals, such as the DIFF signal 18, are single ended, as shown. It will be appreciated by those of ordinary skill in the art however that such design choices are based on particular circuit specifications and can be readily varied to meet different requirements.

The TPOS detector output signal 28 provides the detector output signal 38 for a first time interval, for example following power up or reset of the detector 10 because, as will become apparent, the running mode detector output signal 30 (referred to herein alternatively as the POSCOMP signal 30) may not provide accurate target detection, at least until the AGC process has been completed.

The TPOS detector 24 includes a comparator 80 having a first input (or pair of differential inputs in the case of the illustrative embodiment) responsive to the magnetic field sensor signal 16 and a second input (again, here a pair of differential inputs) responsive to a threshold signal 84. The TPOS threshold signal 84 is initially set to a predetermined level and is adjusted from the predetermined level in order to reduce phase error once it is determined that the running mode detector output signal 30 is accurate. More particularly, the TPOS threshold signal 84 is at the predetermined level during a first portion of the first time interval and is adjusted during a second portion of the first time interval so as to minimize the phase error between edge detection by the TPOS detector and edge detection by the running mode detector.

The predetermined level to which the TPOS threshold signal 84 is initially set is selected to ensure switching on each gear tooth 12a-12n, regardless of airgap and other tolerances. This may be achieved with a TPOS trim 92 coupled to a digital-to-analog converter (DAC) 94, as shown. During manufacture, the detector 10 is tested with a target, or gear 12 positioned at the maximum specified airgaps and the TPOS detector output signal 28 is monitored to ensure switching on each gear tooth. Fuses in a resistor network are then selectively blown in order to provide a voltage level for the TPOS threshold signal 84 that ensures switching on each gear tooth regardless of airgap. In one illustrative embodiment, the TPOS threshold signal 84 is initially set to a value on the order of 50 millivolts.

The TPOS threshold signal 84 remains at the predetermined level for a first portion of the first time interval, until the running mode detector output signal 30 is accurate, following which the TPOS threshold signal is adjusted during a second portion of the first time interval. Various schemes are possible in order to determine that the running mode detector output signal 30 is accurate and thus, that the TPOS threshold signal 84 should be adjusted so as to minimize the phase error between detection by the TPOS detector and detection by the running mode detector. In one illustrative embodiment, the first portion of the first time interval ends after a predetermined number of gear tooth detections (i.e., after a predetermined number of transitions occur in the TPOS detector output signal 28). For example, in one embodiment, the predetermined number of TPOS detector output signal transitions is ten, corresponding to six transitions (i.e., three gear teeth) during which AGC is active and four transitions (i.e., two gear teeth) thereafter to ensure that the running mode detector output signal 30 is accurate.

Referring to FIG. 3, an illustrative magnetic field sensor signal 16 is shown. As is apparent from FIG. 2, the magnetic field sensor signal 16 is a differential signal. However, signal 16 is shown in FIG. 3A in a single-ended form to facilitate illustration of the invention. Also shown in FIG. 3A is the TPOS threshold signal 84. As is shown, the TPOS threshold signal 84 is at a predetermined level for a first portion, from time t0 to time t1, of the first time interval, from time t0 time t2, until the running mode detector output signal is accurate.

Referring also to FIG. 3B, the TPOS detector output signal 28 is shown. In the illustrative embodiment, the TPOS output signal 28 is at a logic high level when the magnetic field sensor signal 16 is greater than the TPOS threshold signal 84 and is at a logic low level when the magnetic field sensor signal 16 is less than the TPOS threshold signal 84, as shown.

An illustrative running mode detector 26 is shown and will be described in conjunction with FIG. 2A. The DIFF signal 18 is applied to the non-inverting input of a first comparator 200 and to the inverting input of a second comparator 204. The output signals of comparators 200 and 204 provide input signals GT_PDAC 258 and LT_NDAC 260, respectively, to a synchronization logic circuit 208 that provides control signals to counters 214 and 230, as shown.

More particularly, logic circuit 208 provides a p_updn signal 262 to an UPDN input of a counter 214 to control the count direction. As will become apparent, the p_updn signal 262 normally causes the counter 214 to count up. Under certain conditions however, the p_updn signal 262 causes the counter 214 to count down for a single clock cycle. The counter 214 is clocked by a system clock signal, CLK. A p_hold signal 264 is coupled to a HOLD input of the counter 214. The counter output is held constant (i.e., the counter is disabled) when the HOLD input signal is at a first logic level and is released (i.e., the counter is enabled) when the HOLD input signal is at the second logic level. In the illustrative embodiment, the counter 214 is a six bit counter which is enabled when the HOLD input is low. The counter 214 is reset by a DAC_RESET_N signal in response to the AGC circuit 20 such that the counter is reset whenever the AGC counter 74 (FIG. 2) is incremented.

The outputs of the counter 214 are coupled to inputs of a Positive Digital-to-Analog Converter (PDAC) 100. The output of the PDAC 100 is buffered by a buffer 224 to provide a PDAC signal, here a voltage, 102 that tracks the positive peaks of the DIFF signal 18.

The comparator 200, counter 214, PDAC 100 and buffer 224 comprise a "positive portion" of the detector circuitry. A "negative portion" of the detector 26 is similarly arranged, as shown. More particularly, logic circuit 208 provides a n_updn signal 266 to an UPDN input of counter 230 to control the count direction. As will become apparent, the n_updn signal 266 normally causes the counter 230 to count down. Under certain conditions however, the n_updn signal 266 causes the counter 230 to count up for a single clock cycle. The counter 230 is clocked by a system clock signal, CLK. A n_hold signal 268 is coupled to a HOLD input of the counter 230. The counter output is held constant (i.e., the counter is disabled) when the HOLD input signal is at a first logic level and is released (i.e., the counter is enabled) when the HOLD input signal is at the second logic level. In the illustrative embodiment, the counter 230 is a six bit counter which is enabled when the HOLD input is low. The counter 230 is reset by the DAC_RESET_N signal whenever the AGC counter 74 (FIG. 2) is incremented.

The outputs of the counter 230 are coupled to inputs of a Negative Digital-to-Analog Converter (NDAC) 104. The output of the NDAC 104 is buffered by a buffer 236 to provide an NDAC signal, here a voltage, 106 that tracks the negative peaks of the DIFF signal 18.

The buffered PDAC and NDAC voltages are coupled to a resistor divider comprising series-coupled resistors 108, 112, 114, and 116 in order to generate running mode threshold signals, THRESHHI and THRESHLO, as will be described.

Each of the running mode threshold signals THRESHHI and THRESHLO is a percentage of the difference between the PDAC and NDAC voltages or, in other words, a percentage of the peak-to-peak DIFF signal 18. In the illustrative embodiment, the detector 26 is provided with hysteresis using threshold signals THRESHHI and THRESHLO at one of three different threshold signal levels, depending on whether certain threshold criteria are met, as will be described. The three different threshold signal levels correspond to three different percentages of the peak-to-peak DIFF signal, as established by signals 140, 148, and 144 at circuit nodes between resistors 108 and 112, resistors 112 and 114, and resistors 114 and 116, respectively.

In one illustrative embodiment, upper threshold level 140 is at approximately 75% of the peak-to-peak DIFF signal, a second, center threshold level 148 is at approximately 50% of the peak-to-peak DIFF signal, and a third, lower threshold level 144 is at approximately 25% of the peak-to-peak DIFF signal. Switches 124a-124d are arranged and controlled so as to apply one of the three threshold levels to comparators 128 and 130, as shown. More particularly, switch 124a is controlled by an inverted version of the COMPHI output signal of comparator 128, or signal COMPHIN, and switch 124b is controlled by the COMPHI signal. With this arrangement, depending on the state of the COMPHI signal, either the upper threshold level or the center threshold level is applied to the inverting input of comparator 128 for comparison to the DIFF signal to provide the COMPHI signal. Similarly, switch 124c is controlled by an inverted version of the COMPLO output signal of comparator 130, or signal COMPLON, and switch 124d is controlled by the COMPLO signal. With this arrangement, depending on the state of the COMPLO signal, either the center threshold level or the lower threshold level is applied to the inverting input of comparator 130 for comparison to the DIFF signal to provide the COMPLO signal.

An exclusive-OR (XOR) gate 132 is responsive to the COMPHI and to the COMPLO signals to provide a signal 134 to the clock input of a D flip-flop 136, as shown. The D input to the flip-flop 136 is coupled to the QN output as shown and the POSCOMP signal 30 is provided at the Q output. The set input to the flip-flop 136 is controlled by an AND gate 150 that is responsive to the COMPHI and to the COMPLO signals and the reset input of the flip-flop 136 is controlled by a NOR gate 154 that is responsive to the COMPHI and to the COMPLO signals, as shown.

The hysteresis operation of the detector 26 will be described in conjunction with FIGS. 4-4F. FIG. 4 shows an illustrative DIFF signal 18 in relation to the THRESHHI signal and the THRESHLO signal. FIG. 4A shows the output signal 134 of the XOR gate 132, FIG. 4B shows the COMPHI signal at the output of comparator 128, and FIG. 4C shows the COMPLO signal at the output of comparator 130. The set output of AND gate 150 is shown in FIG. 4D and the reset output of NOR gate 154 is shown in FIG. 4E. The resulting running mode detector output signal, or POSCOMP signal 30 is shown in FIG. 4F.

In operation, if the DIFF signal 18 passes through an outer threshold level 140 or 144 (i.e., meets the outer threshold criteria), then the respective threshold signal, THRESHHI and THRESHLO, is set to the center threshold level 148, here at 50% of the peak-to-peak DIFF signal. For example, when the DIFF signal passes through the upper threshold level 140 in the direction from low to high, switch 124b is closed to set the THRESHHI signal to the center threshold level 148 and when the DIFF signal passes through the lower threshold level 144 in the direction from high to low, switch 124c is closed to set the THRESHLO signal to the center threshold level 148. The POSCOMP signal transitions at the center threshold level 148 when the output of comparator 128 (COMPHI) switches low and when the output of comparator 130 (COMPLO) switches high, here at times t1-t6, t8-t11, t13-t16.

Alternatively, if the DIFF signal 18 does not cross an outer threshold signal 140, 144, then switches 124a and 124d are closed, thereby setting the THRESHHI signal to upper threshold level 140 and setting the THRESHLO signal to the lower threshold level 144 to provide hysteresis under such DIFF signal conditions. More particularly, when the DIFF signal passes the center threshold 148 in the direction from low to high, switch 124d is closed, thereby setting the THRESHLO signal to the lower threshold level 144, as occurs here at time t11. When the DIFF signal passes through the center threshold 148 in the direction from high to low, the THRESHHI signal is set to the upper threshold signal level 140, as occurs here at time t6. The POSCOMP signal transitions at the hysteresis points (140, 144) instead of the nominal switch point 148 under the following conditions: The POSCOMP signal transitions at the lower threshold level 144 when the output of comparator 128 (COMPHI) is low, POSCOMP is high, and the COMPLO signal switches low (at time t12) and the POSCOMP signal transitions at the upper threshold level 140 when COMPLO is high, POSCOMP is low, and the COMPHI signal switches high (at time t7).

The above-described hysteresis scheme advantageously provides switching at the 50%, or center threshold level, thereby providing higher accuracy switching under normal operating conditions when the outer threshold criteria is met. Whereas, when the DIFF signal does not meet the outer threshold criteria, hysteresis is provided, thereby advantageously providing immunity to noise and vibration.

Referring again to FIG. 2A, preferably the running mode threshold signal levels 140, 144, and 148 are updated so as to remain at the desired percentage of the peak-to-peak DIFF signal regardless of variations in the DIFF signal. To this end, an update controller 126 and a synchronization logic circuit 208 are provided. In the illustrative embodiment, the update controller 126 and synchronization logic circuit 208 implement a scheme in which updating on peak-to-peak DIFF signal changes of decreasing magnitude (i.e., "inward" updating) is limited to reduce or eliminate unneeded update events, as will be described further in connection with FIGS. 2B and 2C. It will be appreciated by those of ordinary skill in the art that alternative schemes, such as those described in the above-referenced U.S. Pat. No. 6,525,531, may be used to update the PDAC voltage 102 and the NDAC voltage 106.

Figure 2A:
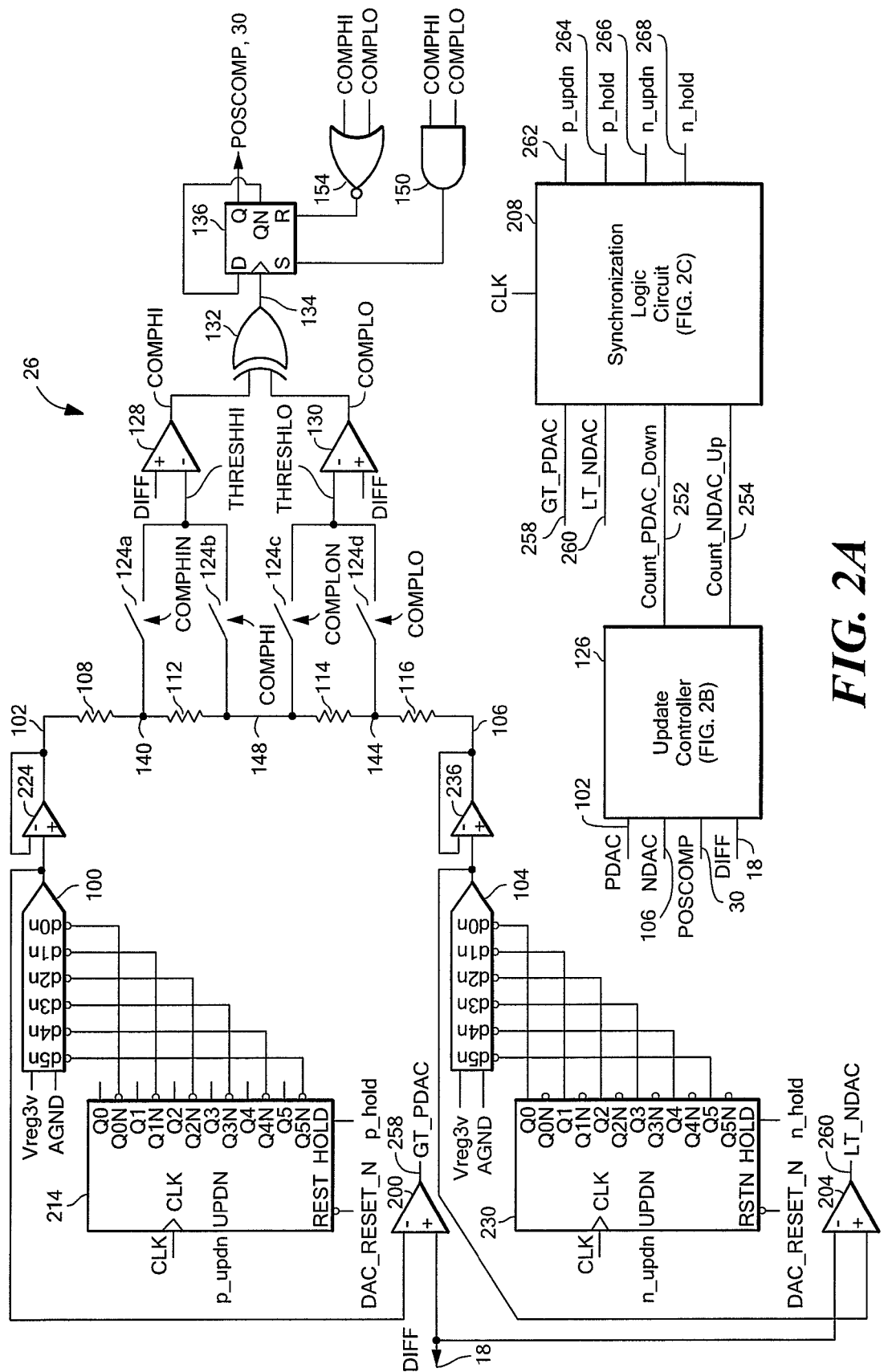
FIG. 2A shows an illustrative embodiment of the running mode detector of FIG. 2.
Figure 2B:
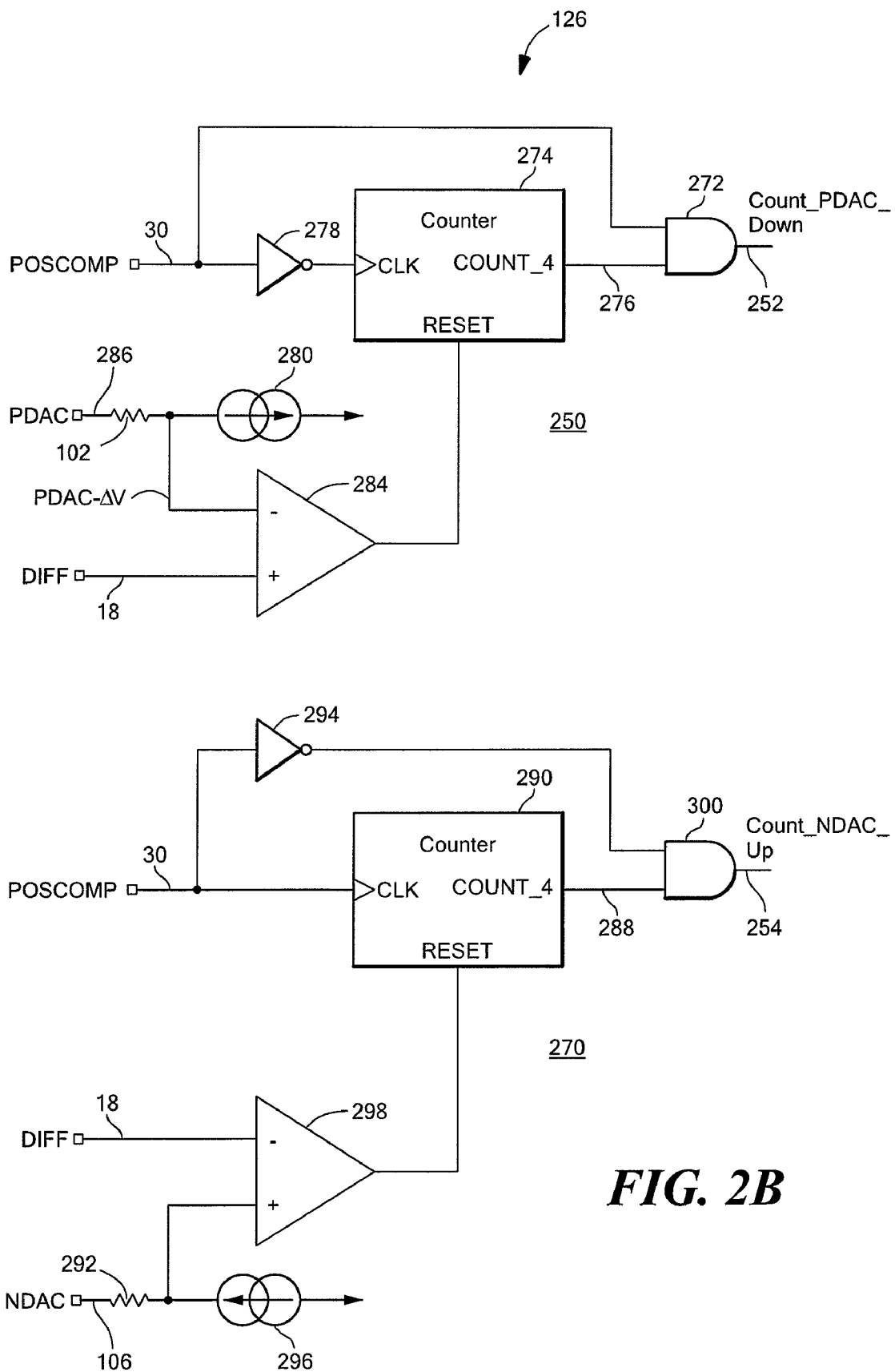
FIG. 2B shows an illustrative embodiment of the update controller of FIG. 2A.

Referring also to FIG. 2B, an illustrative embodiment for the update controller 126 of FIG. 2A is shown to include a positive portion 250 responsive to the POSCOMP signal 30, the PDAC signal 102 and the DIFF signal 18 for generating a Count_PDAC_Down signal 252. A negative circuit portion 270 is responsive to the POSCOMP signal 30, the NDAC signal 106 and the DIFF signal 18 for generating a Count_NDAC_Up signal 254, as shown.

Circuit portion 250 includes a counter 274 that is clocked by an inverted version of the POSCOMP signal 30 and that is reset by the output signal of a comparator 284. Counter 274 provides a Count_4 output signal 276 that goes high when a predetermined number of positive clock signal edges (i.e., negative edges of the POSCOMP signal 30) have occurred. In the illustrative embodiment, the predetermined number of positive clock signal edges is four. However, it will be appreciated that this number can be readily varied. Comparator 284 provides an output signal that goes high when the DIFF signal 18 exceeds a positive update threshold signal, PDAC−Δv, that is at a predetermined offset voltage below the PDAC signal 102, as established by resistor 286 and current source 280. The output signal 276 of counter 274 is coupled to an input of an AND gate 272, a second input to which is provided by the POSCOMP signal 30, as shown.

Referring also to the illustrative DIFF signal 18, PDAC signal 102, and PDAC−Δv signal of FIG. 2D, the PDAC signal 102 is lowered by one PDAC increment (i.e., the Count_PDAC_Down signal 252 goes high) once four positive peaks of the DIFF signal occur that are lower than the PDAC−ΔV signal level (i.e., once four negative transitions of the POSCOMP signal occur, causing the Count_4 signal 276 to go high). For example, at times t2 and t3, the PDAC signal 102 is lowered by one DAC increment since the Count_4 signal 276 goes high on positive edges of the POSCOMP signal. However, once the PDAC signal exceeds the PDAC−Δv level, as occurs at time t1 for example, the counter 274 is reset and another four positive peaks of the DIFF signal must exceed the PDAC−Δv signal before the PDAC signal is lowered again. In this way, limited "inward" updating of the PDAC signal is achieved since the PDAC signal is decreased only when a predetermined number of consecutive DIFF signal positive peaks are below the PDAC−ΔV signal level.

"Outward" outdating of the PDAC signal occurs 102 freely. In other words, any time the DIFF signal 18 exceeds the PDAC signal 102, the PDAC signal is increased, for example as shown at time t0.

Similar to PDAC circuit portion 250, NDAC circuit portion 270 includes a counter 290 that is clocked by the POSCOMP signal 30 and that is reset by the output signal of a comparator 298. Counter 290 provides a Count_4 output signal 288 that goes high when a predetermined number of positive edges of the POSCOMP signal 30 occur, such as four in the illustrated embodiment. Comparator 298 provides an output signal that goes high when the DIFF signal 18 falls to below a negative update threshold signal, NDAC+Δv, that is at a predetermined offset voltage above the NDAC signal 106, as established by a resistor 292 and current source 296. The output of counter 290 is coupled to an input of an AND gate 300, a second input to which is provided by an inverted version of the POSCOMP signal 30 at the output of an inverter 294, as shown.

Referring also to the illustrative DIFF signal 18, NDAC signal 106, and NDAC+Δv signal of FIG. 2E, the NDAC signal 106 is increased by one NDAC increment (i.e., the Count_NDAC_Up signal 254 goes high) once four negative peaks of the DIFF signal occur that are greater than the NDAC+ΔV signal level (i.e., once four positive transitions of the POSCOMP signal occur, causing the Count_4 signal 288 to go high). For example, at times t2 and t3, the NDAC signal 106 is raised by one DAC increment since the Count_4 signal 288 goes high on positive edges of the POSCOMP signal. However, once the NDAC signal falls to below the NDAC+Δv level, as occurs at time t1 in FIG. 2E for example, the counter 290 is reset and another four consecutive negative peaks of the DIFF signal must be above the NDAC+Δv signal before the NDAC signal is increased again. In this way, limited "inward" updating of the NDAC signal is achieved since the NDAC signal is increased only when a predetermined number of consecutive DIFF signal negative peaks exceed the NDAC+Δv signal level.

"Outward" outdating of the NDAC signal 106 occurs freely. In other words, any time the DIFF signal 18 falls to below the NDAC signal 106, the NDAC signal is decreased, for example as shown at time t0.

Figure 2C:
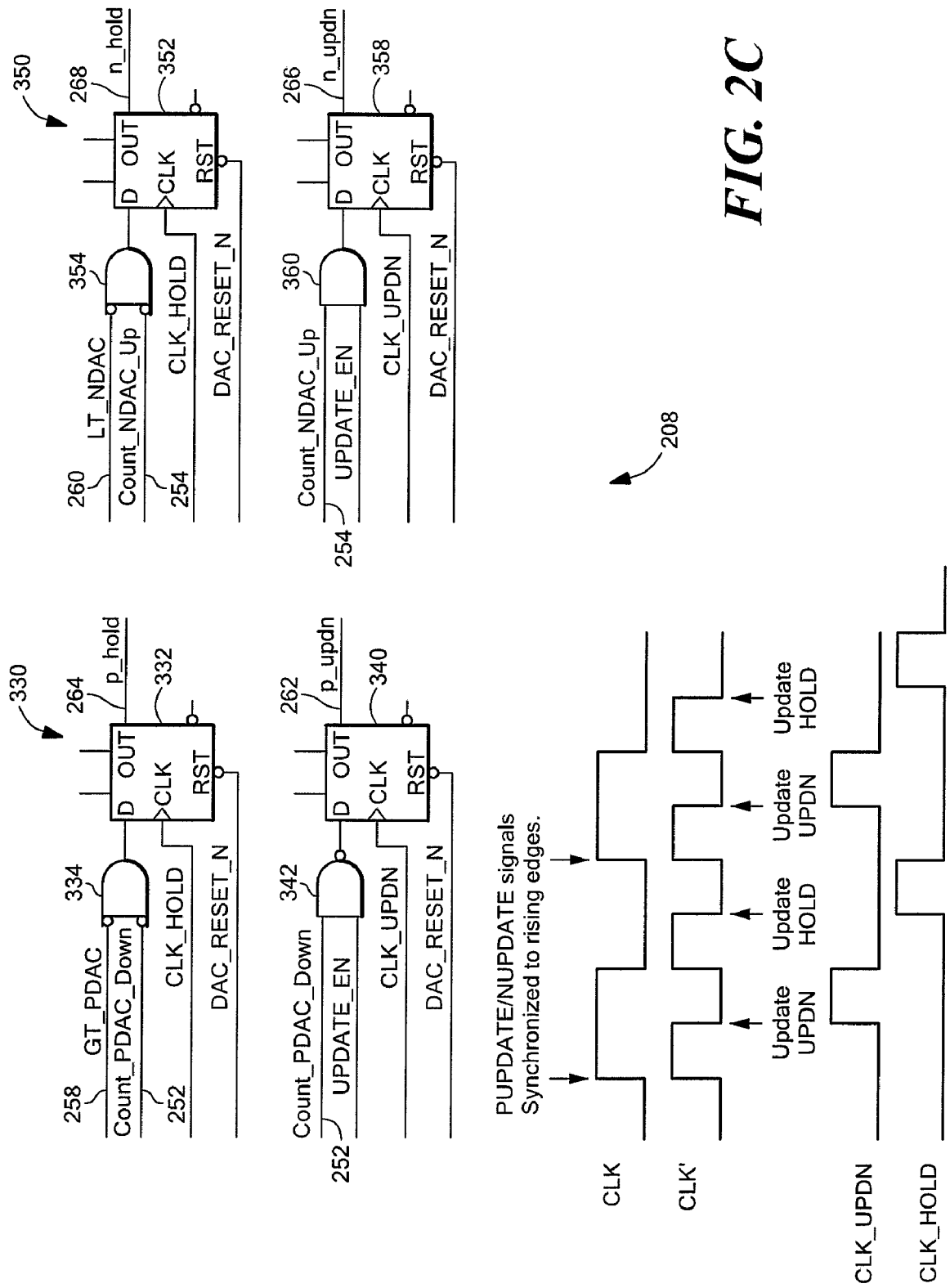
FIG. 2C shows an illustrative embodiment of the synchronization logic circuit of FIG. 2A.

Referring also to FIG. 2C, an illustrative embodiment of the synchronization logic circuit 208 of FIG. 2A is shown. The synchronization circuit 208 synchronizes operation of the counters 214, 230 to the clock signal, CLK. To this end, the logic circuit 208 includes a PDAC portion 330 that generates the p_hold signal 264 and the p_updn signal 262 and an NDAC portion 350 that generates the n_hold signal 268 and the n_updn signal 266.

A clock signal CLK', here having a frequency that is twice the frequency of the clock signal, CLK, is used for synchronizing certain counter control signals as follows. A CLK_HOLD signal is generated to synchronize the p_hold and n_hold signals to occur on every other falling edge of the CLK' signal and a CLK_HOLD signal is generated to synchronize the p_updn and n_updn signals to occur on the alternate ones of every other falling edge of the CLK' signal, as shown. A UPDATE_EN signal allows the PDAC and NDAC signals to be updated once the AGC operation ends, for example, once 3 gear teeth have passed.

The PDAC portion 330 of the logic circuit 208 includes a latch 332 having an input provided by an AND gate 334, a clock input responsive to the CLK_HOLD signal, a reset input provided by the DAC_RESET_N signal, and provides the p_hold signal 264 at an output. The AND gate 334 is responsive to the GT_PDAC signal 258 and to the Count_PDAC_Down signal 252, as shown.

In operation, when Count_PDAC_Down 252 is low (indicating that four positive peaks of the DIFF signal less than the PDAC−Δv signal level have not occurred) and PDAC is greater than DIFF (GT_PDAC is high), the input to the latch 332 is high, thereby causing the p_hold signal 264 to go high on the next rising edge of the CLK_HOLD signal, to hold the value of counter 214, thereby preventing updating of the PDAC signal 102. Whereas, when the Count_PDAC_Down signal 252 is high (indicating that four positive peaks of the DIFF signal less than the PDAC−Δv signal level have occurred) and the PDAC signal is less than the DIFF signal (GT_PDAC is low), the p_hold signal 264 goes low on the next rising edge of the CLK_HOLD signal to cause the counter 214 to be released and thus, to count.

A second latch 340 of the PDAC portion 330 has an input provided by a NAND gate 342, a clock input responsive to the CLK_UPDN signal, a reset input provided by the DAC_RESET_N signal, and provides the p_updn signal 262 at an output. The NAND gate 342 is responsive to the UPDATE_EN signal and to the Count_PDAC_Down signal 252, as shown.

In operation, when the Count_PDAC_Down signal 252 is high (indicating that four positive peaks of the DIFF signal less than the PDAC−Δv signal level have occurred) and the UPDATE_EN signal is high (indicating that the DACs are free to update since the AGC operation has ended), the input to latch 340 is low, thereby causing the p_updn signal 262 to go low on the next rising edge of the CLK_UPDN signal. A low p_updn signal 262 causes the counter 214 to count down, as occurs, for example at times t2 and t3 in FIG. 2D. Under all other conditions, the latch input and the p_updn signal 262 remain high, thereby causing the direction of counter 214 to be up so as to allow the PDAC 100 to freely track the DIFF signal in the outward, increasing direction as shown at time t0 in FIG. 2D.

The NDAC portion 350 of the synchronization logic circuit 208 operates in a similar manner to the PDAC portion as follows. A latch 352 is provided with an input coupled to the output of an AND gate 354, a clock input responsive to the CLK_HOLD signal, a reset input provided by the DAC_RESET_N signal, and provides the n_hold signal 268 at an output. The AND gate 354 is responsive to the LT_NDAC signal 260 and to the Count_NDAC_Up signal 254, as shown.

In operation, when the Count_NDAC_Up signal 254 is low (indicating that four negative peaks of the DIFF signal greater than the NDAC+ΔV signal level have not occurred) and the NDAC signal 106 is less than the DIFF signal (LT_NDAC is high), the input to the latch 352 is high, thereby causing the n_hold signal 268 to go high on the next rising edge of the CLK_HOLD signal, to hold the value of counter 230, thereby preventing updating of the NDAC signal 106. Whereas, when the Count_NDAC_Up signal 254 is high (indicating that four negative peaks of the DIFF signal greater than the NDAC+ΔV signal level have occurred) and the NDAC signal is greater than the DIFF signal (LT_NDAC is low), the n_hold signal 268 goes low on the next rising edge of the CLK_HOLD signal to cause the counter 230 to be released and thus, to count.

A second latch 358 of the NDAC portion 350 has an input provided by a NAND gate 360, a clock input responsive to the CLK_UPDN signal, a reset input provided by the DAC_RESET_N signal, and provides the n_updn signal 266 at an output. The NAND gate 360 is responsive to the UPDATE_EN signal and to the Count_NDAC_Up signal 254, as shown.

In operation, when the Count_NDAC_Up signal 254 is high (indicating that four negative peaks of the DIFF signal greater than the NDAC+ΔV signal level have occurred) and the UPDATE_EN signal is high (indicating that the DACs are free to update since the AGC operation has ended), the input to latch 358 is low, thereby causing the n_updn signal 266 to go low on the next rising edge of the CLK_UPDN signal. A low p_updn signal 266 causes the counter 230 to count up, as occurs, for example, at times t2 and t3 in FIG. 2E. Under all other conditions, the latch input and the n_updn signal 266 remain high, thereby causing the direction of counter 230 to be down so as to allow the NDAC 104 to freely track the DIFF signal in the outward, decreasing direction, as shown at time t0 in FIG. 2E.

It will be appreciated by those of ordinary skill in the art that different types of detectors may be used in place of the above-described running mode detector 26. As one example a peak-referenced detector may be used in which the threshold signal is at a predetermined offset from the positive and negative peaks of the DIFF signal, so that the detector output signal transitions when the DIFF signal falls away from its positive and negative peaks by the predetermined offset.

It will also be appreciated that other schemes are possible to provide hysteresis to the detector output signal 38 and also to update the threshold signal to remain at the desired percentage of the peak-to-peak DIFF signal. Examples of both an alternative hysteresis scheme and of alternative threshold update schemes are described in the above-referenced U.S. Pat. No. 6,525,531.

Referring now to FIGS. 3B and 3C, waveforms associated with the running mode detector 26 are shown. In particular, FIG. 3C shows the DIFF signal 18 resulting from AGC operation on the magnetic field sensor signal 16 of FIG. 3, the PDAC signal 102, the NDAC signal 106, and a running mode threshold signal 122. It will be appreciated by those of ordinary skill in the art that, for the above-described running mode detector 26 of FIG. 2A, there are two running mode threshold signals, THRESHHI and THRESHLO, each of which is at one of two threshold signal levels at any given time. In other embodiments, there may be a single running mode threshold signal that provides hysteresis by assuming different signal levels. For example, in the above-referenced U.S. Pat. No. 6,525,531, a threshold signal Vth is at a first signal level corresponding to a first percentage of the peak-to-peak DIFF signal when the DIFF signal exceeds the threshold signal or is at a second signal level corresponding to a second percentage of the peak-to-peak DIFF signal when the DIFF signal is less than the threshold signal. As a further alternative, the running mode threshold signal may remain at a fixed percentage of the peak-to-peak DIFF signal, without providing hysteresis. For simplicity of illustration, the running mode threshold signal 122 shown in FIG. 3C is at a fixed percentage of the peak-to-peak DIFF signal, such as at 70% (PDAC-NDAC).

Figure 3D:
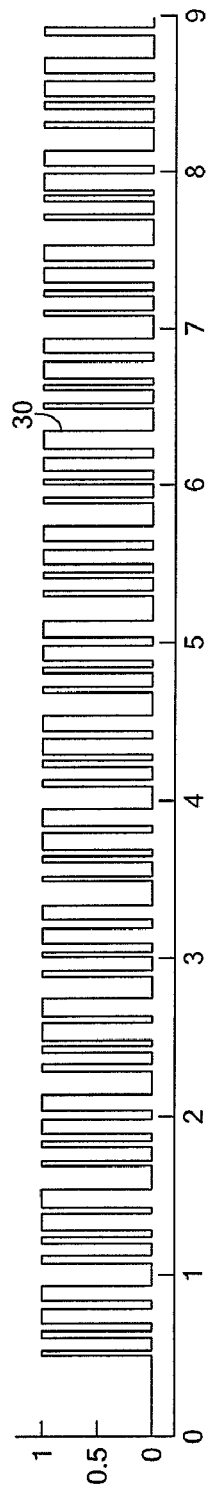
FIG. 3D shows the running mode detector output signal in response to the waveforms of FIG. 3C.

The running mode detector output signal 30, herein also referred to as the POSCOMP signal, is shown in FIG. 3D. Here, the POSCOMP signal 30 is at a logic high level when the DIFF signal 18 is greater than the running mode threshold signal 122 and is at a logic low level when the DIFF signal 18 is less than the running mode threshold signal 122, as shown.

The reason that the TPOS detector 24 is used to provide the detector output signal 38 for a first time interval (e.g., from time t0 to t2 in FIG. 3A) is because the PDAC signal 102 and the NDAC signal 106 do not immediately, accurately reflect the peaks and valleys of the DIFF signal. In the illustrative embodiment, the NDAC signal 106 is initially set to the positive supply rail of the detector and the PDAC signal 102 is initially set to the negative supply rail of the detector so that they can reliably acquire the respective one of the negative and positive peaks of the DIFF signal. However, during the AGC process, the PDAC and NDAC signals are reset each time the AGC counter 74 increments. As a result, the running mode detector output signal 30 is not relied on until after AGC operation ends and for some time thereafter in order to allow the PDAC 100 and NDAC 104 time to acquire the positive and negative peaks. Once the running mode output signal 30 is considered accurate, here at time t1, the TPOS threshold signal 84 is adjusted. This is achieved with the phase detector 32, a dynamic TPOS logic circuit 90, a counter 88, a DAC 86, and a summing node 96 (FIG. 2).

Figure 3E:
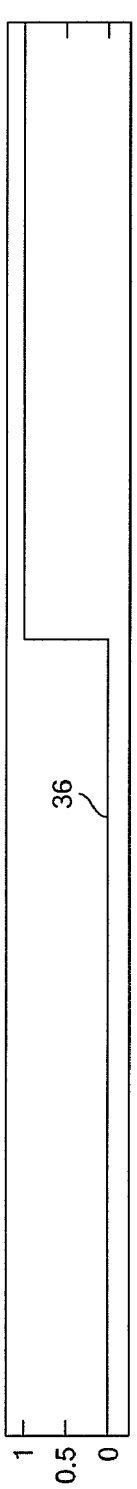
FIG. 3E shows the phase detector output signal provided in response to the TPOS detector output signal of FIG. 3B and the running mode detector output signal of FIG. 3D.
Figure 3F:
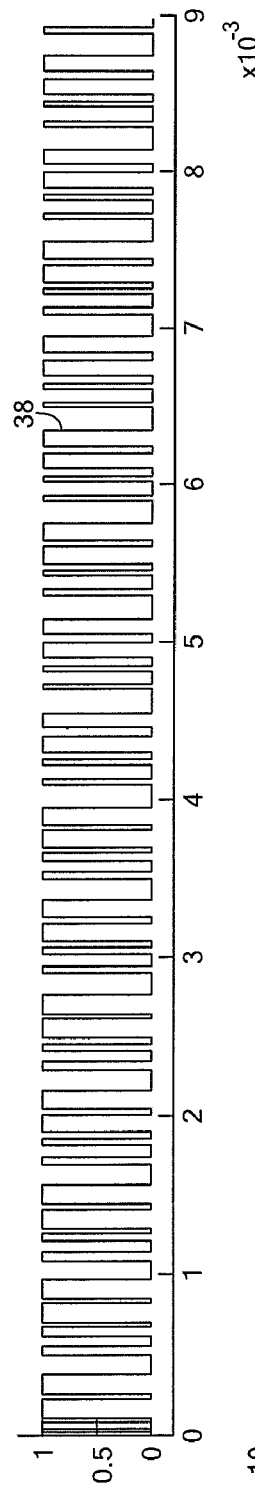
FIG. 3F shows the detector output signal provided in response to the waveforms of FIGS. 3-3E.
Figure 5:
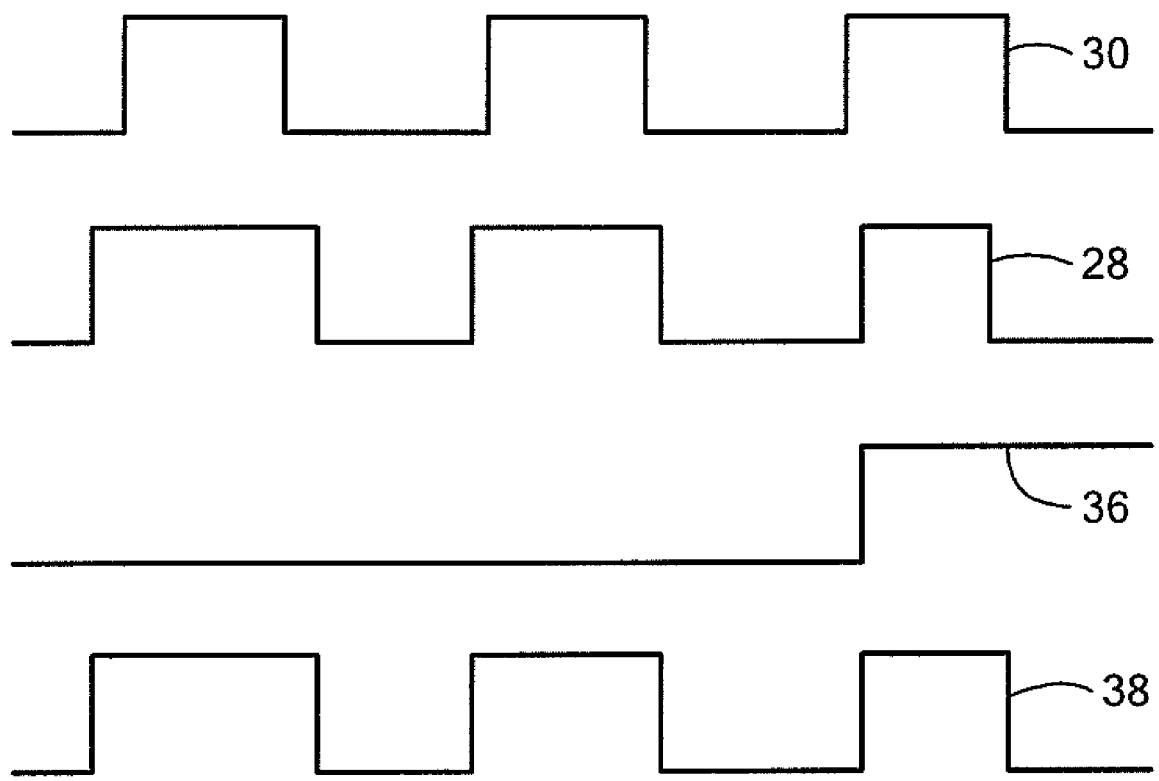
FIG. 5 shows an expanded view of a portion of the TPOS detector output signal of FIG. 3B, the running mode detector output signal of FIG. 3D, the phase detector output signal of FIG. 3E, and the detector output signal of FIG. 3F.

Referring also to FIG. 5 an time-expanded view of a portion of the TPOS detector output signal 28 of FIG. 3B, the running mode detector output signal 30 of FIG. 3D, the phase comparator output signal 36 of FIG. 3E, and the detector output signal 38 of FIG. 3F, are shown. In operation, the phase detector 32 samples the TPOS output signal 28 and the running mode output signal 30 to determine which is leading and which is lagging. More particularly, the phase detector output signal 36 is at a first logic level, here a logic low level, when the rising edges of the TPOS detector output signal 28 lead the rising edges of the running mode detector output signal 30 and is at a second logic level, here a logic high level, when the rising edges of the TPOS detector output signal lag the rising edges of the running mode detector output signal. If the TPOS detector output signal 28 is leading the running mode detector output signal 30 (i.e., if the control signal 36 is low), then the TPOS threshold signal 84 is incremented until the TPOS detector output signal just lags the running mode detector output signal (i.e., until the phase detector output signal 36 transitions to a high level indicating a change in the phase relationship between the two signals); whereas, if the TPOS detector output signal 28 is lagging the running mode detector output signal 30 (i.e., if the control signal 36 is high), then the TPOS detector output signal 84 is decremented until the TPOS detector output signal just leads the running mode detector output signal (i.e., until the phase detector output signal 36 transitions to a low level, again indicating a change in the phase relationship between the two signals).

More particularly, the phase detector 32 provides a binary output signal 36, referred to also as a control signal, to the dynamic TPOS logic circuit 90 and to the output switch 34 at a first logic level, here low, if the TPOS detector output signal 28 is leading the running mode detector output signal 30 and at a second logic level, here high, if the TPOS detector output signal is lagging the running mode detector output signal. The dynamic TPOS logic circuit 90 outputs a pulse 82 to the counter 88 causing the counter to increment on each TPOS cycle for as long as the phase detector control signal 36 remains unchanged. In other words, the counter 88 continues to count for as long as there is not a change in the phase relationship between the TPOS detector output signal 28 and the running mode detector output signal 30. The dynamic TPOS logic circuit 90 outputs an additional signal 98 to the counter 88 that controls whether the counter counts up or down as a function of whether the phase detector control signal 36 is high or low (i.e., whether the TPOS detector output signal 28 is leading or lagging the running mode detector output signal 30).

The DAC 86 converts the output of the counter 88 into an analog signal that is then added to or subtracted from the output signal of the DAC 94 by the summing node 96, thereby causing the TPOS threshold signal 84 to be incremented or decremented accordingly. Thus, the counter 88 causes the TPOS threshold signal 84 to be incremented or decremented as necessary to move the phase of the TPOS detector output signal 28 towards the phase of the running mode detector output signal 30.

Preferably, the output of the DAC 86 is incremented on either the rising edge or the falling edge of the magnetic field sensor signal 16 in order to avoid chatter in the TPOS detector output signal 28. More particularly, when the TPOS threshold signal 84 is being incremented, the DAC output, and thus also the TPOS threshold signal 84, is incremented on the falling edges of the magnetic field sensor signal 16; whereas when the TPOS threshold signal 84 is being decremented, the TPOS threshold signal is decremented on the rising edges of the magnetic field sensor signal. This arrangement prevents the TPOS detector output signal 28 from chattering since it reinforces the hysteresis to the comparator 80.

Once a transition occurs in the phase detector output signal 36, the dynamic TPOS logic circuit 90 does not output a pulse to the counter 88, thereby causing the counter 88 to stop counting. Also in response to a transition in the phase detector output signal 36, the output switch 34 switches from providing the detector output signal 38 in the form of the TPOS detector output signal 28 to providing the detector output signal 38 in the form of the running mode detector output signal 30. Thus, a transition in the phase detector output signal 36 marks the transition between the first time interval and the second time interval.

The above-described operation is apparent from consideration of the time-expanded waveforms of FIG. 5. When the phase detector control signal 36 transitions, at a time t2, indicating a change in the phase relationship between the signals 28 and 30 (here that the TPOS detector output signal 28 that initially led the running mode detector output signal 30 now lags), the detector output signal 38 begins to be provided by the running mode detector output signal 30.

Figure 3G:
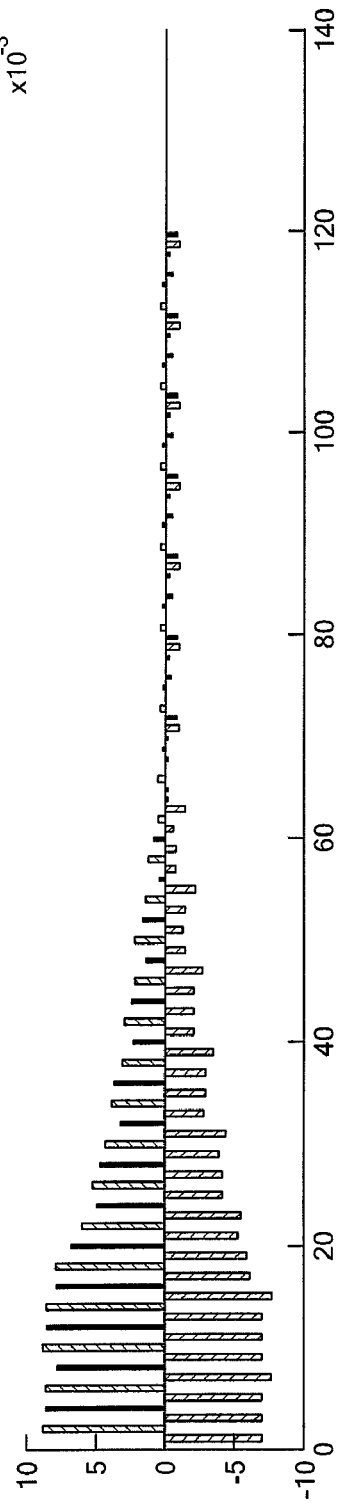
FIG. 3G shows the phase error associated with detections by the magnetic article detector of FIGS. 2-2C and the waveforms of FIGS. 3-3F.

Referring also to FIG. 3G, the absolute phase error of the detector output signal 38 of FIG. 3F is shown, here in relation to detections of the same gear tooth edge on different revolutions, both for output signal transitions occurring on the rising edges of the magnetic field signal and for transitions occurring on the falling edges of the magnetic field signal. As is apparent, the absolute phase error remains fairly constant and at its highest level during the first portion of the first time interval, between t0 and t1, when the detector output signal 38 is provided by the TPOS detector and the TPOS threshold is at a predetermined, fixed level. During the second portion of the first time interval, from t1 to t2 however, the absolute phase error decreases, when the detector output signal 38 is provided by the TPOS detector and the TPOS threshold is adjusted. Finally, the absolute error is at its minimum during the second time interval, starting at time t2, when the detector output signal 38 is provided by the, now accurate running mode detector.

The AGC circuit 20 and, more particularly, the counter 74 within the AGC auto gain adjust circuit 70 determines the size of the steps of the TPOS threshold signal 84 as it is adjusted during the second portion of the first time interval, between times t1 and t2. In large airgap applications, in which no gain decrements are made during AGC, the step size of the TPOS threshold signal is a nominal, small value, such as on the order of 0.73 millivolts; whereas, in large airgap applications, in which a significant numbers of gain decrements are made, the output of counter 74 will be a large value, resulting in a concomitantly large step size for the TPOS threshold signal, such as on the order of 9.57 millivolts.

The manner in which the AGC counter 74 controls the size of the steps of the TPOS threshold signal 84 is by binary weighting the input voltage to the DAC 86. In the illustrative embodiment, the largest TPOS threshold increment is approximately thirteen times greater than the smallest TPOS threshold increment. It will be appreciated by those of ordinary skill in the art that since the TPOS threshold increment size is determined by the AGC counter output 22, the extremes of the smallest and largest TPOS threshold increment size will be a function of the extremes of the peak-to-peak values of the magnetic field sensor signal 16 which, in turn, is a function of the back bias magnetics and the target profile.

This feature is apparent from consideration of the illustrative waveforms of FIGS. 6-6G, which show the same waveforms as in FIGS. 3-3G, but for a different installation airgap.

In particular, FIGS. 3-3G correspond to an airgap of 0.75 mm and FIGS. 6-6G correspond to an airgap of 2.9 mm. The larger airgap example of FIGS. 6-6G yields a smaller magnetic field sensor signal magnitude, as shown in FIG. 6 in differential form and in FIG. 6A in single-ended form for simplicity of illustration. The result is that few or no gain decrements occur during AGC of the waveform of FIG. 6A, causing the output 22 of counter 74 (FIG. 2) to remain at zero. This low count causes the step size of the DAC 86 to be small, such as on the order of the nominal value of 0.73 millivolts.

With this arrangement, the step size associated with adjusting the TPOS threshold signal 84 is advantageously tailored to the installation airgap, thereby causing the TPOS threshold signal 84 to be adjusted so that the phase of the TPOS detector output signal 28 is brought towards the phase of the running mode detector output signal 30 in as few a number of increments as is possible without resulting in too large of a phase jump. In the illustrated embodiment, the phase error occurring at the transition from TPOS operation to running mode operation will depend on the installation airgap, since it is the installation airgap that determines the predetermined TPOS threshold value provided during the first portion of the first time interval and how different that value is from the running mode threshold (which is a percentage of the peak-to-peak DIFF signal). Thus, because of the scheme used in the illustrative embodiment and described above to set the predetermined TPOS threshold level (i.e., of testing the detector with a target positioned at the maximum specified airgaps and setting the TPOS threshold level so as to ensure switching on each gear tooth under both extremes), in larger airgap installations, the two threshold signals 84, 122 will be closer to each other in terms of absolute phase location of TPOS and running mode detections than in smaller airgap installations.

Referring also to FIG. 6G, the absolute phase error of the detector output signal 38 of FIG. 6F is shown. Similar to FIG. 3G, the phase error is at its highest level during the first portion of the first time interval, between times t0 and t1, when the detector output signal 38 is provided by the TPOS detector and the TPOS threshold is at a predetermined, fixed level. The absolute phase error decreases during the second portion of the first time interval, between time t1 and t2, the when the detector output signal 38 is provided by the TPOS detector and the TPOS threshold is adjusted, and the absolute error is at its minimum during the second time interval, starting at time t2, when the detector output signal 38 is provided by the TPOS detector.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. Apparatus for detecting passing magnetic articles and providing a magnetic article detector output signal indicative of the passing magnetic articles comprising:
   a magnetic field sensor providing a signal having an amplitude proportional to an ambient magnetic field and having a gain;
   an automatic gain control circuit responsive to the magnetic field sensor signal for adjusting the gain of the magnetic field sensor signal by an adjustment amount related to the amplitude of the magnetic field sensor signal to provide a gain-controlled version of the magnetic field sensor signal; and
   a detector comprising a comparator having a first input responsive to the magnetic field sensor signal or the gain-controlled version of the magnetic field sensor signal, a second input responsive to a threshold signal, and an output at which the magnetic article detector output signal is provided, wherein the threshold signal is adjustable in response to the adjustment amount.

2. The apparatus of claim 1 further comprising a second detector comprising a second comparator having a first input responsive to the magnetic field sensor signal or the gain-controlled version of the magnetic field sensor signal, a second input responsive to a second threshold signal, and an output at which a second detector output signal is provided, wherein the magnetic article detector output signal is provided by the output signal of the detector for a first time interval and is provided by the second detector output signal for a second time interval following the first time interval.

3. The apparatus of claim 2 further comprising a phase comparator responsive to the output signal of the detector and to the second detector output signal for providing a control signal that controls the transition between the first time interval and the second time interval.

4. The apparatus of claim 1 wherein the automatic gain control circuit comprises an amplifier responsive to the magnetic field sensor signal and having an adjustable feedback element for providing the gain-controlled version of the magnetic field sensor signal.

5. The apparatus of claim 4 further comprising an auto gain adjust circuit comprising:
   an auto gain adjust comparator having a first input responsive to the gain-controlled version of the magnetic field sensor signal, a second input responsive to an AGC threshold signal, and an output at which a comparator output signal is provided; and
   a counter responsive to the auto gain adjust comparator output signal for providing a counter output signal indicative of the adjustment amount, wherein the feedback element is adjustable in response to the counter output signal.

6. The apparatus of claim 5 further comprising a digital-to-analog converter for providing the threshold signal, wherein an input signal to the digital-to-analog converter is binary weighted in response to the counter output signal.

7. The apparatus of claim 1 wherein the threshold signal is initially at a predetermined level during a first time interval portion and is adjusted by increments determined by the adjustment amount during a second time interval portion following the first time interval portion.

8. The apparatus of claim 7 wherein the first time interval portion ends after a predetermined number of transitions occur in the magnetic article detector output signal.

9. A method for detecting passing magnetic articles and providing a magnetic article detector output signal indicative of the passing magnetic articles comprising:
   providing a magnetic field signal having an amplitude proportional to an ambient magnetic field and having a gain;
   adjusting the gain of the magnetic field signal by an adjustment amount related to the amplitude of the magnetic field signal to provide a gain-controlled version of the magnetic field signal;
   comparing the magnetic field signal or the gain-controlled version of the magnetic field signal to a threshold signal to provide a first comparison output signal as the magnetic article detector output signal; and
   adjusting the threshold signal based on the adjustment amount.

10. The method of claim 9 wherein comparing provides the magnetic article detector output signal for a first time interval and wherein the method further comprises comparing the gain-controlled version of the magnetic field signal to a running mode threshold signal to provide a second comparison signal, wherein the second comparison signal provides the magnetic article detector output signal during a second time interval following the first time interval.

11. The method of claim 10 further comprising comparing the phase of the first comparison signal to the phase of the second comparison signal and transitioning from the first time interval to the second time interval in response to a change in the phase comparison.

12. The method of claim 9 wherein adjusting the gain of the magnetic field signal to provide a gain-controlled version of the magnetic field signal includes adjusting a feedback element of an amplifier that is responsive to the magnetic field signal and that provides the gain-controlled version of the magnetic field signal.

13. The method of claim 12 further comprises:
adjusting the feedback element of the amplifier to achieve a maximum gain signal;
comparing the maximum gain signal to an AGC threshold signal; and
controlling a counter in response to the comparison of the maximum gain signal and the AGC threshold signal to provide a counter output signal, wherein the counter output signal determines the adjustment amount by which the threshold signal is adjusted.

14. The method of claim 9 wherein adjusting includes adjusting the threshold signal during a second time interval portion following a first time interval portion when the threshold signal is at a predetermined level.

15. The method of claim 14 further comprising terminating the first time interval portion after a predetermined number of transitions occur in the magnetic article detector output signal.

16. Apparatus for detecting passing magnetic articles and providing a magnetic article detector output signal indicative of the passing magnetic articles comprising:

a magnetic field sensor providing a signal having an amplitude proportional to an ambient magnetic field and having a gain;

an automatic gain control circuit responsive to the magnetic field sensor signal for adjusting the gain of the magnetic field sensor signal by an adjustment amount related to the amplitude of the magnetic field sensor signal to provide a gain-controlled version of the magnetic field sensor signal;

a first circuit responsive to the magnetic field sensor signal to provide a first output signal indicative of the passing magnetic articles, wherein the first output signal provides the magnetic article detector output signal during a first time interval, wherein the first circuit comprises a comparator having a first input responsive to the magnetic field sensor signal, a second input responsive to a threshold signal and an output at which the first output signal is provided, wherein the threshold signal is adjustable in response to the adjustment amount; and a second circuit responsive to the magnetic field sensor signal to provide a second output signal indicative of the passing magnetic articles, wherein the second output signal provides the magnetic article detector output signal during a second time interval following the first time interval.

17. The method of claim 16 wherein the first time interval ends after a predetermined number of transitions occur in the magnetic article detector output signal.

18. The method of claim 16 wherein the threshold signal is at a predetermined level during a first portion of the first time interval and is adjusted by increments determined by the adjustment amount during a second portion of the first time interval.

19. The method of claim 16 wherein the automatic gain control circuit comprises a counter for providing a count signal indicative of the adjustment amount.

* * * * *

UNITED STATES PATENT AND TRADEMARK OFFICE
CERTIFICATE OF CORRECTION

PATENT NO. : 7,619,406 B2  Page 1 of 1
APPLICATION NO. : 12/041055
DATED : November 17, 2009
INVENTOR(S) : Voisine et al.

It is certified that error appears in the above-identified patent and that said Letters Patent is hereby corrected as shown below:

Column 1, line 48, delete "an" and replace with -- and --.

Column 3, line 47, delete "digital to analog" and replace with -- digital-to-analog --.

Column 3, lines 49-50, delete "digital to analog" and replace with -- digital-to-analog --.

Column 11, line 56, delete "PDAC signal occurs 102" and replace with -- PDAC signal 102 occurs --.

Column 15, line 1, delete "an" and replace with -- a --.

Column 16, line 48, delete "numbers" and replace with -- number --.

Column 17, line 37, delete "to" and replace with -- t0 --.

Column 17, lines 41-42, delete ", the when the" and replace with -- , when the --.

Signed and Sealed this

Sixteenth Day of February, 2010

David J. Kappos
*Director of the United States Patent and Trademark Office*